US010860136B2

(12) United States Patent
Sugimoto et al.

(10) Patent No.: US 10,860,136 B2
(45) Date of Patent: Dec. 8, 2020

(54) PORTABLE ELECTRONIC DEVICE AND METHOD OF CONTROLLING INPUT OPERATION

(75) Inventors: Kayo Sugimoto, Tokyo (JP); Makoto Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 1543 days.

(21) Appl. No.: 12/429,815

(22) Filed: Apr. 24, 2009

(65) Prior Publication Data

US 2009/0207148 A1 Aug. 20, 2009

Related U.S. Application Data

(63) Continuation of application No. 11/133,307, filed on May 20, 2005, now Pat. No. 7,545,366.

(30) Foreign Application Priority Data

Jun. 3, 2004 (JP) ................................ 2004-166451

(51) Int. Cl.
*G06F 3/0488* (2013.01)
*G06F 3/041* (2006.01)

(52) U.S. Cl.
CPC ........ *G06F 3/0418* (2013.01); *G06F 3/04886* (2013.01)

(58) Field of Classification Search
CPC .................. G06F 3/04886; G06F 2203/04805
USPC ........................................ 345/173, 157, 179
See application file for complete search history.

(56) References Cited

U.S. PATENT DOCUMENTS

| | | | | |
|---|---|---|---|---|
| 5,115,107 A | | 5/1992 | Crooks et al. | |
| 5,119,079 A | * | 6/1992 | Hube | G03G 15/5016 345/173 |
| 5,266,931 A | * | 11/1993 | Tanaka | G06F 3/0383 178/18.01 |
| 5,528,267 A | * | 6/1996 | Ise | G06F 3/0412 178/18.06 |
| 5,565,894 A | * | 10/1996 | Bates | G06F 3/0418 345/173 |
| 5,594,471 A | * | 1/1997 | Deeran et al. | 345/173 |

(Continued)

FOREIGN PATENT DOCUMENTS

| | | |
|---|---|---|
| JP | 63-197211 A | 8/1988 |
| JP | 7-44321 | 2/1995 |

(Continued)

OTHER PUBLICATIONS

European Search Report dated Jul. 25, 2012 in Patent Application No. 05253181.1.

(Continued)

*Primary Examiner* — Dorothy Harris
(74) *Attorney, Agent, or Firm* — Chip Law Group

(57) ABSTRACT

Disclosed herein is a portable electronic device including an operation surface for inputting an operating action of a user, detecting means for detecting the coordinates of a point of contact of a user's finger with said operation surface, a memory for storing information representing a deviation between the coordinates of a point on said operation surface where the user desires the user's finger to touch said operation surface and the detected coordinates of the point of contact, and correcting means for correcting said deviation based on the stored information.

8 Claims, 20 Drawing Sheets

(56) References Cited

U.S. PATENT DOCUMENTS

| | | | | |
|---|---|---|---|---|
| 5,618,232 | A * | 4/1997 | Martin | A47B 21/007 463/25 |
| 5,627,567 | A * | 5/1997 | Davidson | G06F 3/0488 345/170 |
| 5,742,779 | A * | 4/1998 | Steele et al. | 715/839 |
| 5,818,451 | A * | 10/1998 | Bertram | G06F 3/04886 715/840 |
| 5,844,506 | A * | 12/1998 | Binstead | G06F 3/0202 341/34 |
| 5,905,489 | A * | 5/1999 | Takahama | G06F 3/044 345/156 |
| 5,933,102 | A * | 8/1999 | Miller | G06F 3/044 324/678 |
| 6,073,036 | A * | 6/2000 | Heikkinen | G06F 3/04842 379/354 |
| 6,353,434 | B1 | 3/2002 | Akebi et al. | |
| 6,369,803 | B2 * | 4/2002 | Brisebois et al. | 345/173 |
| 6,408,087 | B1 * | 6/2002 | Kramer | G06F 3/03547 345/156 |
| 6,456,952 | B1 * | 9/2002 | Nathan | G06F 3/0418 178/18.01 |
| 6,498,863 | B1 * | 12/2002 | Gaidoukevitch et al. | 382/173 |
| 6,727,892 | B1 * | 4/2004 | Murphy | 345/173 |
| 6,795,059 | B2 * | 9/2004 | Endo | 345/173 |
| 6,803,905 | B1 * | 10/2004 | Capps | G06F 3/04886 345/172 |
| 6,958,749 | B1 * | 10/2005 | Matsushita | G06F 3/0416 178/18.03 |
| 7,046,235 | B2 | 5/2006 | Katoh | |
| 7,154,483 | B2 * | 12/2006 | Kobayashi | G06F 3/0418 345/173 |
| 7,477,240 | B2 * | 1/2009 | Yanagisawa | G06F 3/04886 178/18.03 |
| 7,518,381 | B2 * | 4/2009 | Lamborghini et al. | 324/679 |
| 2002/0039092 | A1 * | 4/2002 | Shigetaka | 345/156 |
| 2002/0070926 | A1 | 6/2002 | Kavanagh | |
| 2003/0222858 | A1 * | 12/2003 | Kobayashi | 345/173 |
| 2004/0178994 | A1 * | 9/2004 | Kairls, Jr. | G06F 3/0418 345/173 |
| 2004/0263489 | A1 * | 12/2004 | Wallenius | 345/173 |
| 2005/0075168 | A1 * | 4/2005 | Martin | A47B 21/007 463/37 |
| 2005/0129199 | A1 * | 6/2005 | Abe | G06F 3/0233 379/90.01 |
| 2005/0225540 | A1 * | 10/2005 | Kawakami | G06F 3/04842 345/173 |
| 2005/0253818 | A1 * | 11/2005 | Nettamo | G06F 3/0488 345/173 |

FOREIGN PATENT DOCUMENTS

| | | |
|---|---|---|
| JP | 7-160402 | 6/1995 |
| JP | 10-269022 | * 10/1998 |
| JP | 2000-235452 | 8/2000 |
| JP | 2001-312370 A | 11/2001 |
| JP | 2002-73269 | 3/2002 |
| JP | 2003-177848 A | * 6/2003 |
| JP | 2003-345511 | 12/2003 |
| WO | WO 96/29132 | 9/1996 |
| WO | WO 2004/001576 A1 | 12/2003 |

OTHER PUBLICATIONS

Communication Pursuant to Article 94(3) EPC dated Sep. 4, 2012 in Patent Application No. 05253181.1.
"Algorithm for Decreasing the Error Rate of Data Entered on a Touch-Sensitive Terminal", IBM Technical Disclosure Bulletin, vol. 33, No. 10A, XP000110024, Mar. 1, 1991, pp. 223-227.

* cited by examiner

DEVIATION BETWEEN AREA CENTER AND
TRANSFORMED MEASURED SPOT
(QUADRATIC NONLINEAR FILTER)

DEVIATION BETWEEN AREA CENTER AND
TRANSFORMED MEASURED SPOT
(LINEAR FILTER)

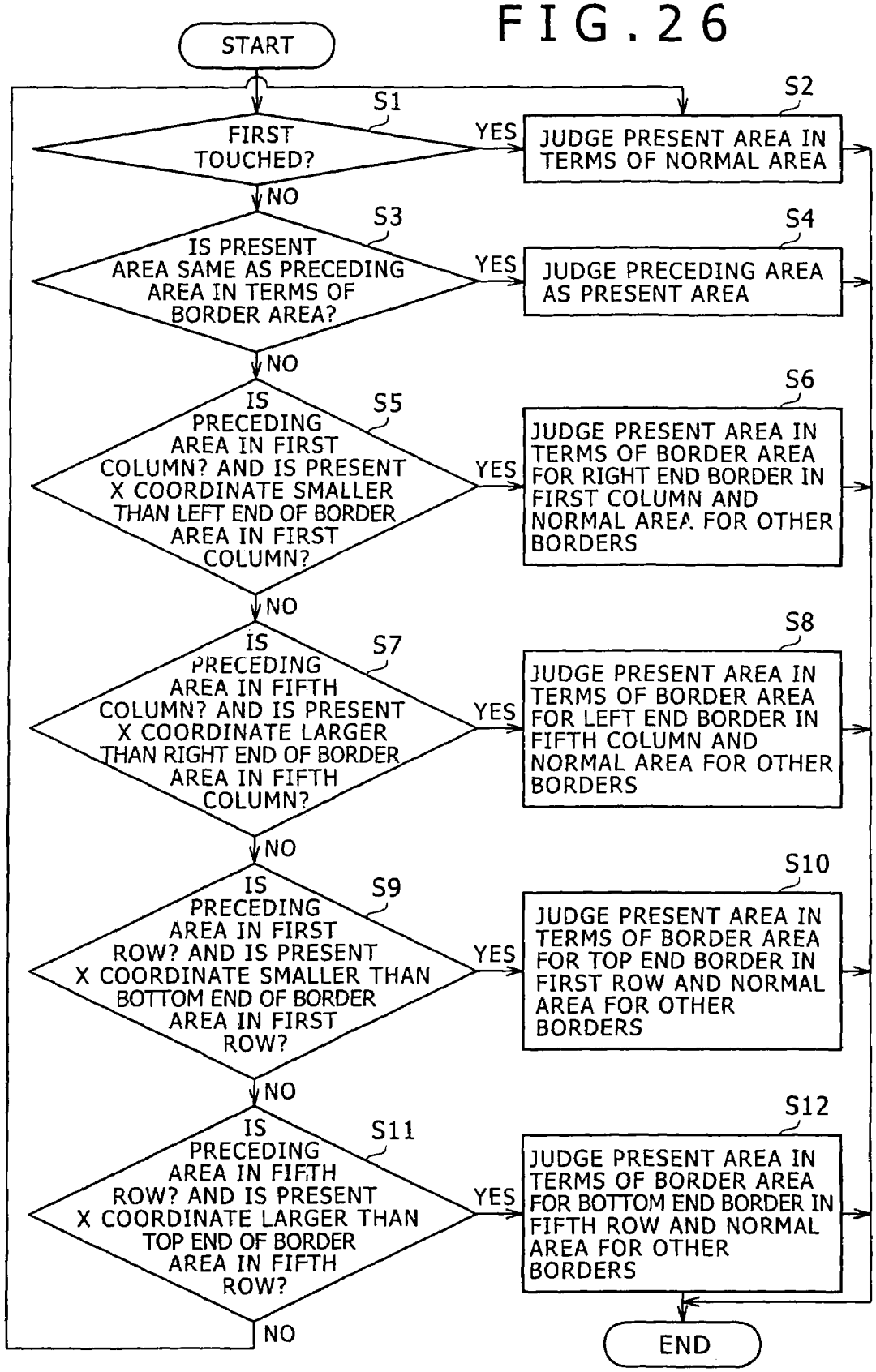

(RETURN TO S13)

PORTABLE ELECTRONIC DEVICE AND METHOD OF CONTROLLING INPUT OPERATION

CROSS REFERENCES TO RELATED APPLICATIONS

This application is a continuation application of U.S. application Ser. No. 11/133,307 filed May 20, 2005, which is based upon and claims the benefit of priority from the prior Japanese Patent Application No. 2004-166451 filed on Jun. 3, 2004. The entire contents of both of those applications are incorporated herein by reference.

BACKGROUND OF THE INVENTION

The present invention relates to a portable electronic device which is capable of controlling input operation required to view images and listen to music, a method of controlling input operation on such a portable electronic device, and a program for controlling input operation on such a portable electronic device.

Heretofore, laptop PCs (Personal Computers) employ a touch pad for moving a cursor, a scroll bar, or the like in images displayed on the display monitor. The touch pad detects the position in which a user's finger or the like touches the touch pad and displays a cursor in an image displayed on the display monitor depending on the touched position. Specifically, when the user's finger touches the touch pad, the electrostatic capacitance between electrodes in the touch pad changes and the touch pad detects the change in the electrostatic capacitance, thereby detecting the position of the user's finger on the touch pad.

There is known an input device including a combination of such a touch pad and a set of operation buttons such as a keyboard. Specifically, sensors for detecting electrostatic capacitance changes are disposed beneath or within keyboard keys. For details, see Japanese Patent Laid-Open No. 2003-223265 (FIGS. 1 and 10). Particularly, the publication discloses an application wherein the input device is reduced in size and incorporated in a cellular phone set.

If the input device is reduced in size and incorporated in a cellular phone set, however, the area of contact with the user's finger on the input device is greater than the area of each of the operation buttons, and the operation buttons are spaced at reduced intervals. Accordingly, the user finds it difficult to touch a desired one of the operation buttons precisely.

An input device, such as a touch pad, for detecting an electrostatic capacitance change is designed to detect the coordinates of the center of gravity of an area where the user has touched the input device because the electrostatic capacitance change is greatest in that area. Since the user's finger is more sensitive toward its fingertip, a spot on the input device that the user is thinking as touching and the area of the input device that is actually touched by a finger portion including the fingertip and the finger cushion may possibly be different from each other. When such a discrepancy occurs, the coordinates of the center of gravity of the area that is actually detected and the coordinates of the spot that the user intends to touch deviate from each other, possibly resulting in the detection of an undesirable operation button as being touched. If the input device is a device for changing the position of an object such as a cursor, a pointer, or the like displayed depending on the coordinates that are detected, then such an object may be displayed in a position not intended by the user when an undesirable operation button is detected as being touched.

On the other hand, if the input device is a device for reflecting a movement of the user's finger in a displayed image, then the input device may display a moved distance different from the moved distance intended by the user or may even display a movement not intended by the user due to fluctuations of detected values such as of electrostatic capacitance and noise.

SUMMARY OF THE INVENTION

The present invention has been made in view of the above circumstances and provides a portable electronic device which is reduced in size and user-friendly for accurately reflecting user's input operation, a method of controlling input operation on such a portable electronic device, and a program for controlling input operation on such a portable electronic device.

To accomplish the above object, there is provided in accordance with the present invention a portable electronic device including an operation surface for inputting an operating action of a user, a detecting unit for detecting the coordinates of a point of contact of a user's finger with the operation surface, a memory for storing information representing a deviation between the coordinates of a point on the operation surface where the user desires the user's finger to touch the operation surface and the detected coordinates of the point of contact, and a correcting unit for correcting the deviation based on the stored information.

The operation surface and the detecting unit include a so-called touch-pad sensor, for example, and detect contact by the user's finger based on an electrostatic capacitance change, for example. The deviation is caused because the operation surface has a small surface area and a sensitive portion of the finger, such as a fingertip, and an area in which the finger actually touches the operation surface are different from each other.

With the above arrangement, even if a point different from a point where the user desires the user's finger to contact the operation surface, the deviation between these points can be corrected based on the above information. Therefore, an operating action that the user makes on the operation surface can accurately be reflected in the operation of the portable electronic device.

In the above portable electronic device, the operation surface may have a plurality of operation buttons, the detecting unit may detect the coordinates of substantially the center of gravity of an area where the user's finger touches the operation surface as the coordinates of the point of contact, the memory may store a function representing a positional relationship between the point on the operation surface where the user desires the user's finger to touch the operation surface, and the coordinates of the center of gravity which are actually detected when the user's finger touches the operation surface, and the correcting unit may include a unit for transforming the detected coordinates of the center of gravity into the coordinates of the point on the operation surface where the user desires the user's finger to touch the operation surface, based on the stored function.

The operation buttons may be arranged in a matrix, for example. The above function may be generated based on coordinate data, sampled in advance from a plurality of persons for each of the operation buttons, of an actual point of contact of the user's finger with the operation button. The deviation may be corrected based on the function by a polynomial approximation process. The polynomials used in the polynomial approximation process may be linear polynomials or polynomials of higher degree such as quadratic polynomials. Preferably, the polynomials should be quadratic polynomials. Using the function, the deviation can be corrected more accurately.

In the portable electronic device, the correcting unit may have a unit for transforming a coordinate system on the operation surface based on an inverse function of the function, and the detecting unit may detect the coordinates of the center of gravity which are detected in the transformed coordinate system, as the coordinates of the point of contact. Specifically, if the coordinate system of the operation surface is converted into a new coordinate system in advance using the above function, then the coordinates detected by the detecting unit may be used as they are without transformation. Since the coordinate system is transformed in advance, the amount of processing operation can be reduced particularly if quadratic polynomials are employed as the above function.

In the portable electronic device, the operation surface may be divided into at least a first area and a second area, and the detecting unit may include a unit for determining which of the first area and the second area the user's finger is touching depending on the detected coordinates. The portable electronic device may further include a unit for setting a first hypothetical frame area disposed outside of and surrounding each of the first and second areas, and a unit for controlling the detecting unit to regard the user's finger as touching the first area when the user moves the user's finger from the first area to the second area adjacent thereto while keeping the user's finger in contact with the first area, as long as the detecting unit is detecting that the user's finger touches both the second area and the first hypothetical frame area around the first area.

According to another embodiment of the present invention, there is also provided a portable electronic device including an operation surface divided into at least a first area and a second area, for inputting an operating action of a user through each of the first area and the second area, a detecting unit for detecting when a user's finger touches the operation surface, a setting unit for setting a first hypothetical frame area disposed outside of and surrounding each of the first and second areas, and a control unit for controlling the detecting unit to regard the user's finger as touching the first area when the user moves the user's finger from the first area to the second area adjacent thereto while keeping the user's finger in contact with the first area, as long as the detecting unit is detecting that the user's finger touches both the second area and the first hypothetical frame area around the first area.

The operation surface and the detecting unit include a so-called touch-pad sensor, for example, and determine which area is contacted by the user's finger by detecting the coordinates of the center of gravity of an area in which the user's finger touches the operation surface. The operation surface may have as many areas as desired. For example, the operation surface may be divided into a 5×5 matrix of 25 areas. For selecting one of a plurality of menu items displayed on a display unit, those menu items may be associated with the areas of the operation surface. The user can select a desired one of the menu items by moving the user's finger from the first area to the second area corresponding to the desired menu item while keeping the finger in touch with the first area.

If the user's finger is to move between a plurality of areas on a touch pad, then when the user's finger is positioned on the border between the areas, the user's finger may frequently repeatedly move between the areas due to slight movements of the user's finger or a deviation between a spot that the user thinks as being contacted by the user's finger and the center of gravity that is actually detected. With the above arrangement of the present invention, when the user moves the finger from the first area to the second area, the user's finger is not regarded as having moved into the second area unless the user's finger moving out of the first area goes beyond the first hypothetical frame area. Therefore, the user's finger is prevented from being undesirably regarded as moving between the areas.

The portable electronic device may further include a peripheral area disposed peripherally around the operation surface and lying substantially flush with the operation surface, and a third area disposed on the operation surface adjacent to the peripheral area, the first hypothetical frame area being set outside of and surrounding the third area by the setting unit, wherein the detecting unit is capable of detecting contact of the user's finger with the peripheral area. The portable electronic device may further include a unit for controlling the detecting unit to regard the user's finger as touching the third area when the user moves the user's finger from the third area to the peripheral area while keeping the user's finger in contact with the third area, as long as the detecting unit is detecting that the user's finger touches both the peripheral area and the first hypothetical frame area around the third area.

With the above arrangement, it is possible to prevent a detected point from moving into the peripheral area and being regarded as not touching any area because the detected point slightly deviates from a point desired by the user, though the user does not actually want to move the finger from the third area into the peripheral area. The third area may be identical to the first area and the second area. Specifically, the first area and the second area may be arranged in a vertical or horizontal array and used as the third area. If the first area and the second area are arranged in the above 5×5 matrix, then each of two columns on the opposite ends of the vertical five columns and two rows on the opposite ends of the horizontal five rows serves as the third area, and the central 3×3 areas serve as the first and second areas.

The portable electronic device may further include a unit for setting a second hypothetical frame area along a border of the third area with respect to the peripheral area, and a unit for controlling the detecting unit to regard the user's finger as not touching the third area when the user moves the user's finger from the peripheral area to the third area while keeping the user's finger in contact with the peripheral area, as long as the detecting unit is detecting that the user's finger touches both the third area and the second hypothetical frame area.

With the second hypothetical frame area being thus set, the user's finger is prevented from being regarded as touching the third area, though the user thinks that the user's finger is not touching any area on the operation surface.

If the third area includes a fourth area and a fifth area that are adjacent to each other, then even when the coordinates of the center of gravity of the user's finger are in the peripheral area, the user's finger is regarded as being positioned in the fourth area provided the coordinates of the center of gravity of the user's finger are in the first hypothetical frame area of the fourth area. When the user thinks that the user's finger is touching the fourth area and slides the user's finger into the fifth area, if the coordinates of the center of gravity of the user's finger are actually in the peripheral area, then the user's finger is regarded as only touching the peripheral area and not touching the fifth area at the time the user's finger goes beyond the first hypothetical frame area of the fourth area.

In the portable electronic device, the third area may include a fourth area and a fifth area adjacent to the fourth area, and the portable electronic device may further include a unit for controlling the detecting unit to regard the user's finger as moving from the fourth area to the fifth area when the user moves the user's finger from the fifth area to the first hypothetical area of the fifth area while keeping the user's finger in contact with the peripheral area and the first hypothetical area of the fourth area.

The portable electronic device may further include a unit for measuring a time required for the user's finger to move from the first area to the second area, wherein the control unit may have a unit for regarding the user's finger as not moving from the first area to the second area if the measured time is equal to or larger than a predetermined time.

According to still another embodiment of the present invention, there is further provided a portable electronic device including an operation surface for inputting an operating action of a user, a detecting unit for detecting when a user's finger contacts the operation surface based on whether an electrostatic capacitance exceeds a predetermined threshold value or not, and a unit for changing the threshold value depending on a state of the operation surface.

By thus changing the threshold value, the accuracy with which to detect contact and noncontact of the user's finger with the operation surface is prevented from being lowered because of the operation surface being charged or distorted due to aging, or having its sensitivity lowered.

If a value detected by the detecting unit fluctuates on the verge of exceeding or not exceeding the threshold value, then it is difficult to determine whether or not the user's finger is actually touching the operation surface.

The portable electronic device may further include a unit for determining whether or not the detecting unit detects that the electrostatic capacitance exceeds the threshold value a predetermined number of times or more, and a unit for controlling the detecting unit to regard the user's finger as touching the operation surface depending on the determined result. Since it is determined whether or not the user's finger touches the operation surface for the first time if it is determined that the detected electrostatic capacitance exceeds or does not exceed the threshold value the predetermined number of times, it is possible to determine whether the user's finger touches the operation surface or not without being affected by the fluctuations.

The detecting unit repeats its detecting action in certain cycles. The predetermined number of times referred to above is determined depending on the above detecting cycles. Because the human finger does not fluctuate in a period of time which is 60 ms. or less, if the detecting action occurs in every 10 ms, then the predetermined number of times is set to six. If the detected electrostatic capacitance is equal to or less than the threshold value successively six times, then the user's finger is regarded as not contacting the operation surface.

According to yet another embodiment of the present invention, there is provided a portable electronic device including an operation surface for inputting an operating action of a user, a first detecting unit for detecting when a user's finger contacts the operation surface, a second detecting unit for detecting a moved distance of the user's finger when the user's finger moves on the operation surface while in contact therewith, and a control unit for controlling the second detecting unit to invalidate the moved distance if the second detecting unit detects that the user's finger moves a predetermined moved distance or greater at predetermined time intervals.

With the above arrangement, if a moved distance that the human finger cannot move in a predetermined distance is detected, then the moved distance is determined as being caused by an abnormal value, such as noise or the like, from the detecting unit, and the moved distance is ignored to prevent a movement not intended by the user from being executed.

In the portable electronic device, the control unit may have a unit for making the invalidated moved distance valid if the second detecting unit detects, a predetermined number of times or more, a moved distance which is identical to the moved distance invalidated by the control unit. Even when a moved distance is determined once as being caused by an abnormal value, if a moved distance that is identical to the moved distance is detected a plurality of number of times, then the moved distance is handled as being highly reliable and valid, making it possible to accurately reflect the operating action intended by the user.

According to an embodiment of the present invention, there is also provided a method of controlling an inputting action, including the steps of detecting the coordinates of a point of contact of a user's finger with an operation surface for inputting an operating action of a user, storing information representing a deviation between the coordinates of a point on the operation surface where the user desires the user's finger to touch the operation surface and the detected coordinates of the point of contact, and correcting the deviation based on the stored information.

According to another embodiment of the present invention, there is also provided a method of controlling an inputting action, including the steps of detecting contact of a user's finger with an operation surface for inputting an operating action of a user, with respect to each of at least a first area and a second area of the operation surface, setting a first hypothetical frame area disposed outside of and surrounding each of the first and second areas, and regarding the user's finger as touching the first area when the user moves the user's finger from the first area to the second area adjacent thereto while keeping the user's finger in contact with the first area, as long as it is detected that the user's finger touches both the second area and the first hypothetical frame area around the first area.

According to still another embodiment of the present invention, there is also provided a method of controlling an inputting action, including the steps of detecting when a user's finger contacts an operation surface for inputting an operating action of a user, based on whether an electrostatic capacitance exceeds a predetermined threshold value or not, and changing the threshold value depending on a state of the operation surface.

According to yet another embodiment of the present invention, there is also provided a method of controlling an inputting action, including the steps of detecting when a user's finger contacts an operation surface for inputting an operating action of a user, detecting a moved distance of the user's finger when the user's finger moves on the operation surface while in contact therewith, and invalidating the moved distance if it is detected that the user's finger moves a predetermined moved distance or greater at predetermined time intervals.

According to a further embodiment of the present invention, there is provided a program for controlling a portable electronic device to perform a process including the steps of detecting the coordinates of a point of contact of a user's finger with an operation surface for inputting an operating action of a user, storing information representing a deviation between the coordinates of a point on the operation surface where the user desires the user's finger to touch the operation surface and the detected coordinates of the point of contact, and correcting the deviation based on the stored information.

According to a still further embodiment of the present invention, there is provided a program for controlling a portable electronic device to perform a process including the steps of detecting contact of a user's finger with an operation surface for inputting an operating action of a user, with respect to each of at least a first area and a second area of the operation surface, setting a first hypothetical frame area disposed outside of and surrounding each of the first and second areas, and regarding the user's finger as touching the first area when the user moves the user's finger from the first area to the second area adjacent thereto while keeping the user's finger in contact with the first area, as long as it is detected that the user's finger touches both the second area and the first hypothetical frame area around the first area.

According to a yet further embodiment of the present invention, there is provided a program for controlling a portable electronic device to perform a process including the steps of detecting when a user's finger contacts an operation surface for inputting an operating action of a user, based on whether an electrostatic capacitance exceeds a predetermined threshold value or not, and changing the threshold value depending on a state of the operation surface.

According to a yet still further embodiment of the present invention, there is provided a program for controlling a portable electronic device to perform a process including the steps of detecting when a user's finger contacts an operation surface for inputting an operating action of a user, detecting a moved distance of the user's finger when the user's finger moves on the operation surface while in contact therewith, and invalidating the moved distance if it is detected that the user's finger moves a predetermined moved distance or greater at predetermined time intervals.

According to the present invention, the portable electronic device is reduced in size and is capable of accurately reflecting inputting actions made by the user.

The above and other objects, features, and advantages of the present invention will become apparent from the following description when taken in conjunction with the accompanying drawings which illustrate a preferred embodiment of the present invention by way of example.

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIG. 26 is a flowchart of a sequence for determining areas based on hystereses;

DETAILED DESCRIPTION OF THE PREFERRED EMBODIMENTS

Figure 1:
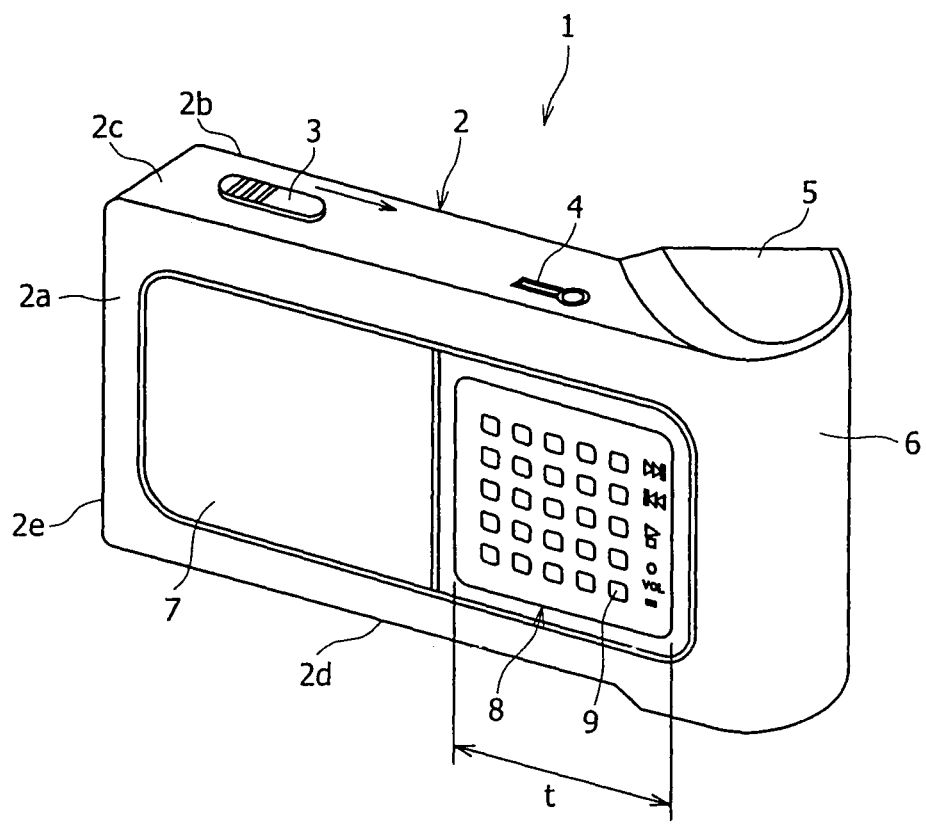
FIG. 1 is a perspective view of a portable electronic device according to an embodiment of the present invention.
Figure 2:
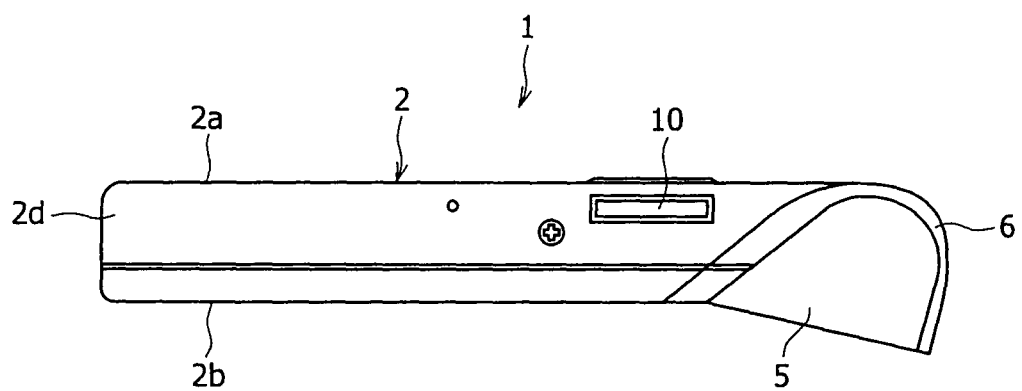
FIG. 2 is a bottom view of the portable electronic device shown in FIG. 1.

FIG. 1 shows in perspective a portable electronic device according to an embodiment of the present invention, and FIG. 2 is a bottom view of the portable electronic device shown in FIG. 1.

As shown in FIGS. 1 and 2, a portable electronic device 1 is a device which incorporates an HDD (Hard Disk Drive), not shown, and which is capable of reproducing music data stored in the hard disk in the HDD. The portable electronic device 1 includes a housing 2 having a front panel 2a supporting thereon a display unit 7 for displaying images and an operation unit 8 disposed adjacent to the display unit 7. The portable electronic device 1 has a grip 6 on an end of the housing 2 for the user to grip when the portable electronic device 1 is in use. The operation unit 8 has a matrix of operation buttons 9 disposed in a square region having sides t each ranging from 4 cm to 5 cm. The display unit 7 includes a liquid crystal device, an organic EL (ElectroLuminescence) device, or the like.

The grip 6 includes a portion 5 projecting from a rear surface 2b of the housing 2 and housing a battery therein. The battery is relatively heavy among other parts of the portable electronic device 1. Therefore, when the battery is placed in the grip 6, the portable electronic device 1 has its center of gravity positioned closely to the grip 6, giving the user a sense of stability when holding the housing 2.

A power switch 3 and a remote control jack 4 are disposed on an upper surface 2c of the housing 2. When the user slides the power switch 3 in the direction indicated by the arrow, for example, the power supply of the portable electronic device 1 is switched on or off. When a remote control unit, not shown, is connected to the remote control jack 4, the user can select, play back, fast-forward, and rewind music with the remote control unit. An audio output terminal, not shown, is disposed on a side surface 2e of the housing 2. An earphone or a headphone, not shown, can be connected to the audio output terminal.

Figure 3:
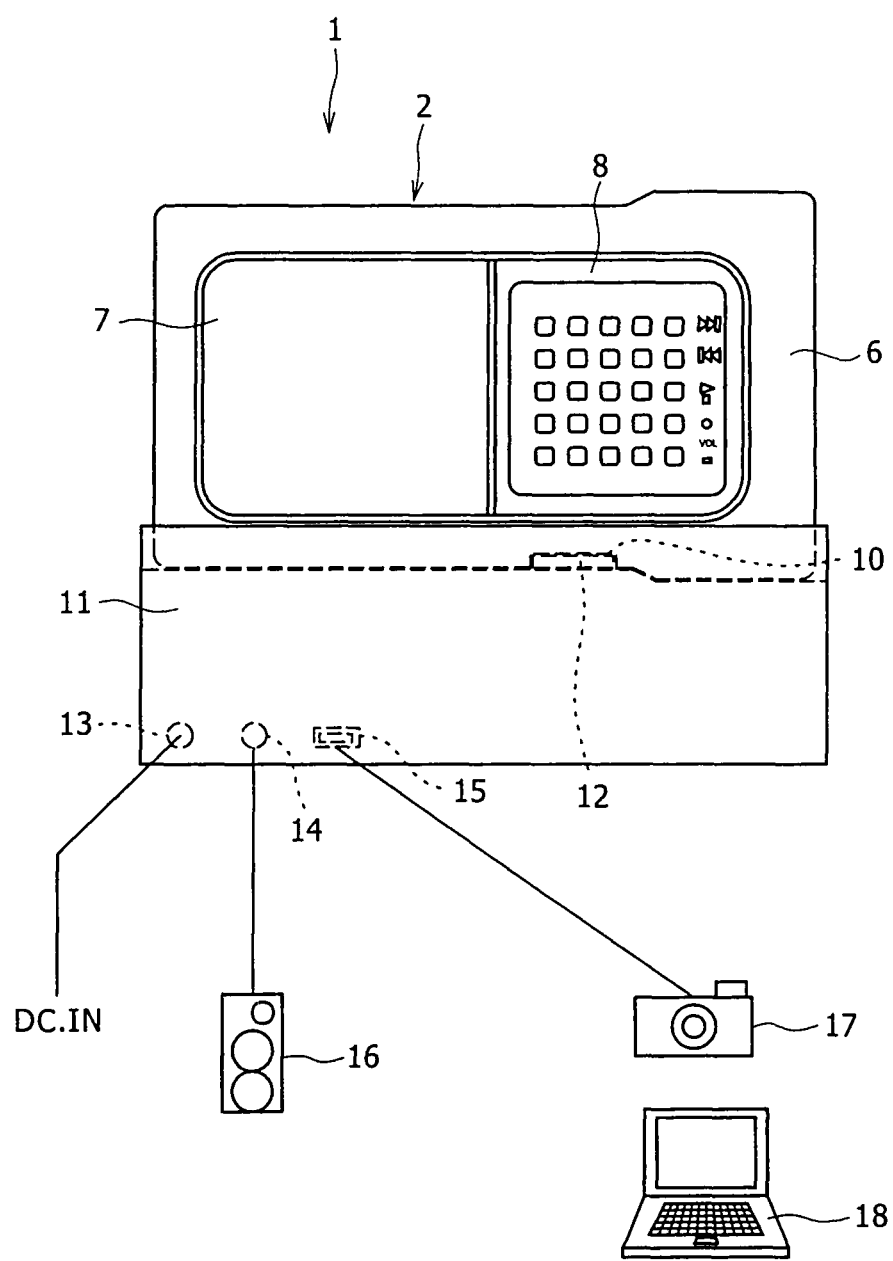
FIG. 3 is a front elevational view of the portable electronic device that is placed in a cradle.

FIG. 3 shows in front elevation the portable electronic device 1 as it is placed in a cradle 11. The cradle 11 has on its rear surface a connection port 13 for connection to a power supply plug, an external output port 14 for outputting music data recorded in the portable electronic device 1 to a speaker 16 or the like, and a USB (Universal Serial Bus) port 15 for connection to a PC 18, a digital camera 17, or the like. As shown in FIGS. 2 and 3, a connector 10 is disposed on a lower surface 2d of the housing 2. When the housing 2 is placed in the cradle 11, the connector 10 is physically connected to the connector 12 on the cradle 11, allowing electric power to be supplied from the power supply plug through the cradle 11 to the portable electronic device 1 and also allowing music data to be downloaded from the PC 18 through the cradle 11 to the portable electronic device 1. When music data are to be downloaded from the PC 18 through the cradle 11 to the portable electronic device 1, the music data are compressed by a data transfer application installed in the PC 18. The compressed music data are then transferred from the PC 18 through the cradle 11 to the portable electronic device 1, and recorded in the hard disk in the portable electronic device 1. The music data may be compressed preferably, but not necessarily, by the MPEG (Moving Picture Experts Group) or ATRAC (Adaptive TRansform Acoustic Coding) process. Images captured by the digital camera 17 may be read through the cradle 11 into the portable electronic device 1 for using the portable electronic device 1 as a so-called photoviewer.

Figure 4:
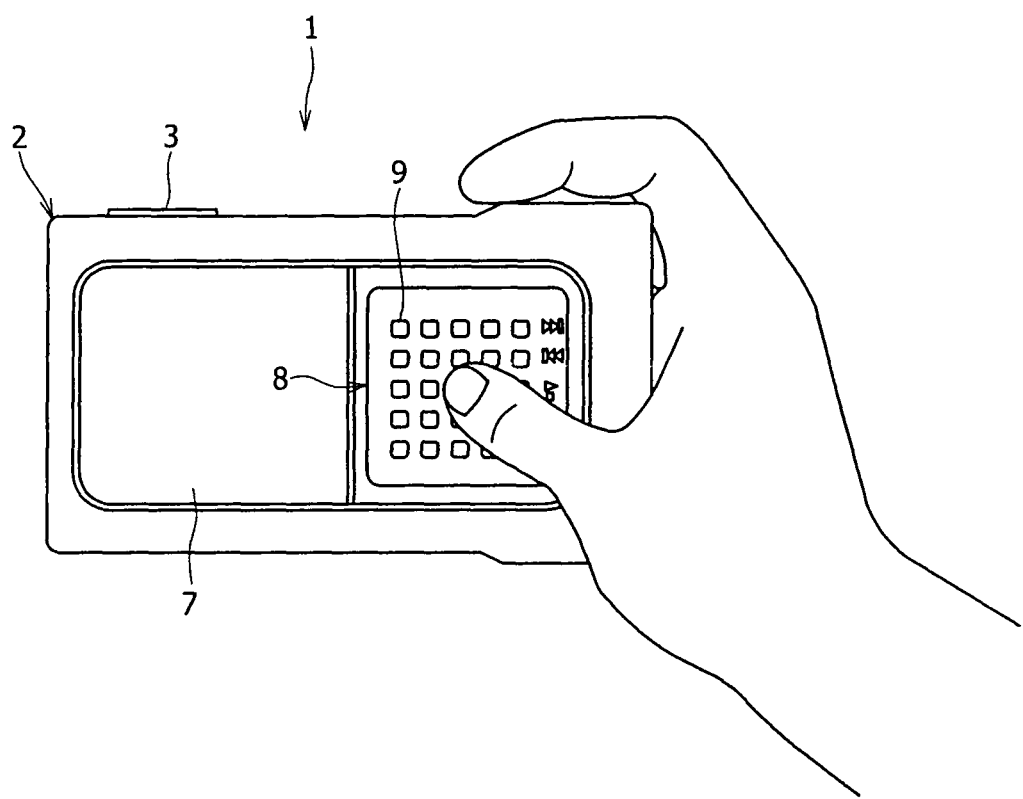
FIG. 4 is a front elevational view of the portable electronic device that the user holds by hand.

FIG. 4 shows the manner in which the user holds the portable electronic device 1 by hand. When the user holds the grip 6 of the portable electronic device 1 by hand, the user can operate the operation unit 8 with the thumb.

Figure 5:
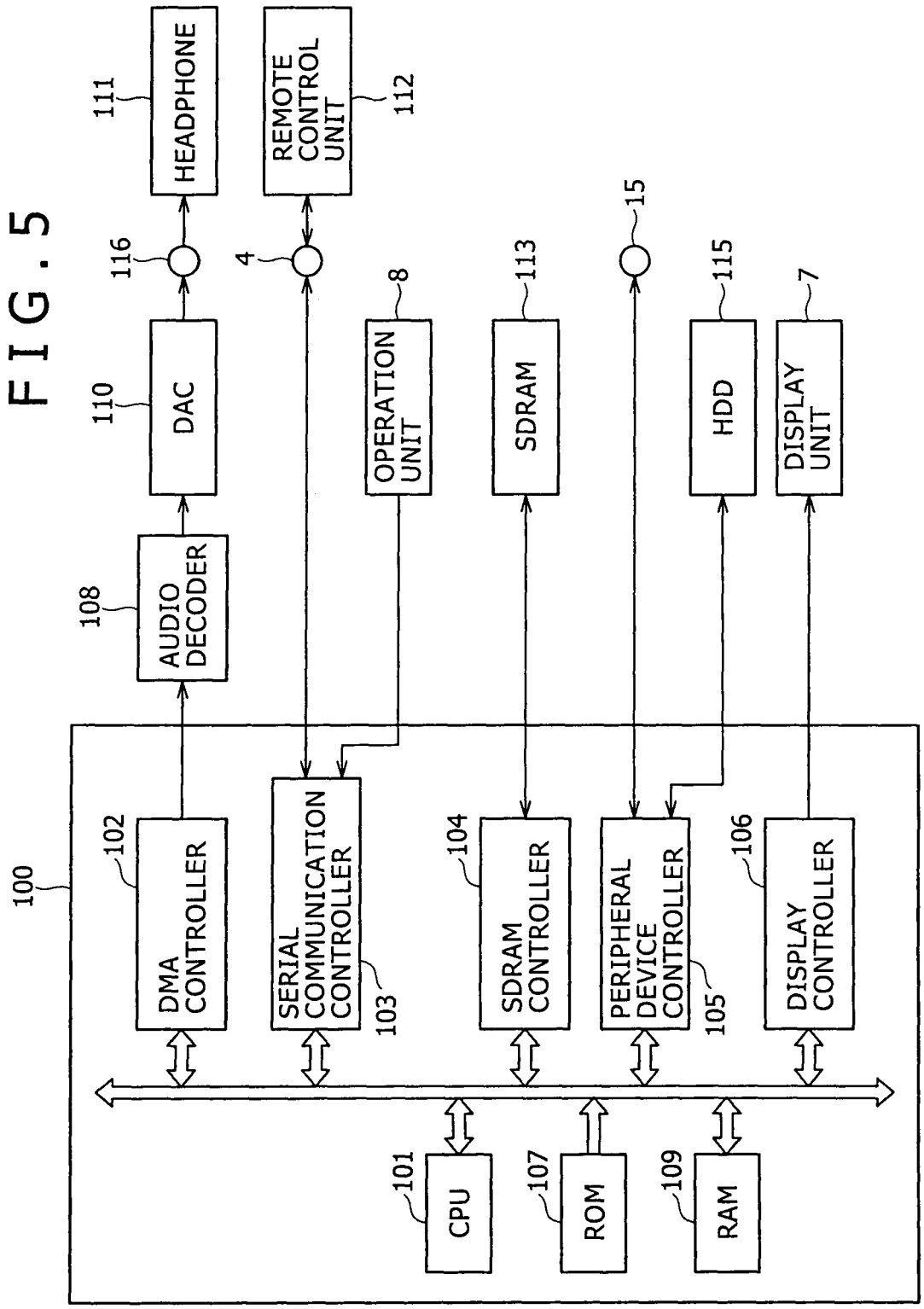
FIG. 5 is a block diagram of a system arrangement of the portable electronic device.

FIG. 5 shows in block form a system arrangement of the portable electronic device 1.

As shown in FIG. 5, the portable electronic device 1 has a system controller 100 including a CPU (Central Processing Unit) 101, a ROM (Read Only Memory) 107, a RAM (Random Access Memory) 109, a DMA (Direct Memory Access) controller 102, a serial communication controller 103, an SDRAM (Synchronous Dynamic RAM) controller 104, a peripheral device controller 105, and a display controller 106.

The CPU 101 controls the overall system of the portable electronic device 1, and performs various processing operations and control operations using the RAM 109 as a working area according to firmware stored in the ROM 107, for example. For example, a program for activating the system, a program for calculating a checksum when the system is activated, and other programs are stored as the firmware in the ROM 107. The DMA controller 102 transfers music data stored in the HDD 115 according to the DMA transfer process for outputting the music data through the audio output terminal 116. The serial communication controller 103 is an interface for controlling input data from a remote control unit 112 and the operation unit 8. The SDRAM controller 104 serves to control the amount of data stored in an SDRAM 113 and data output timing.

The SDRAM 113 is a buffer for temporarily storing music data that are mainly extracted from the HDD 115. Music data stored in the SDRAM 113 are transferred through the DMA controller 102 to an audio decoder 108, which decodes the music data into decoded music data. The decoded music data are converted by a DA (Digital to Analog) converter 110 into analog music data, which are output through the audio output terminal 116 to a headphone 111.

The peripheral device controller 105 controls data as they are input to and output from the HDD 115 and the USB port 15. The display controller 106 controls the display of images on the display unit 7. The display controller 106 controls images to be displayed on the display unit 7 depending on signals input from the operation unit 8 under the control of the CPU 101.

Figure 6:
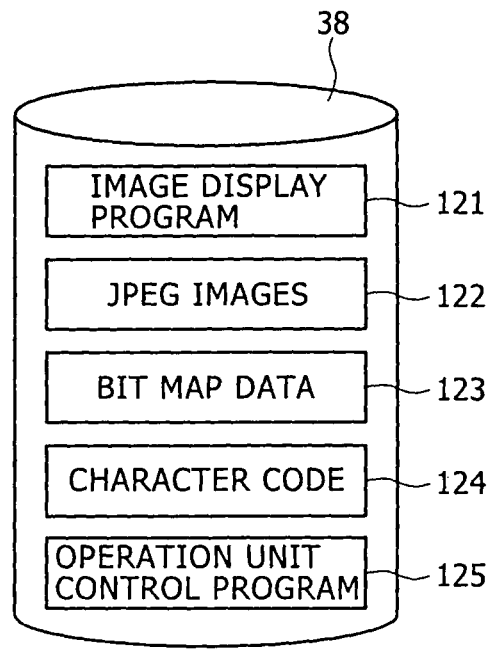
FIG. 6 is a diagram showing data stored in a hard disk.

FIG. 6 shows data stored in a hard disk 38 in the HDD 115. The hard disk 38 stores an image display program 121, JPEG (Joint Photographic Expert Group) images 122, bit map data 123, character codes 124, an operation unit control program 125, etc. The image display program 121 is a program for displaying various images on the display unit 7, and also displays a cursor (to be described later) and applies colors to items selected by the cursors. The JPEG images 122 are images that are displayed in a reproduced image (see FIG. 15) when the reproduced image is displayed. The JPEG images 122 also include images of album jackets, etc. to be displayed. The bit map data 123 are data making up images displayed on the display unit 7, and include data representing a music title 50 shown in FIG. 15 and artist names shown in FIG. 14. The character codes 124 are codes for converting character information into bit map data for displaying the music title 50 in response to an instruction that is given by the system controller 100 to display the music title 50 on the display unit 7.

The operation unit control program 125 serves to make various adjustments and control processes with respect to the detected position, sensitivity, etc. of the user's finger that is detected by the operation unit 8.

Figure 7:
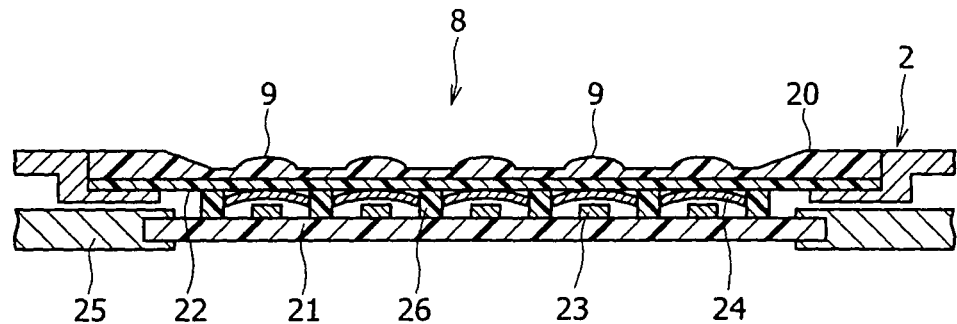
FIG. 7 is a cross-sectional view of an operation unit of the portable electronic device.

FIG. 7 shows the operation unit 8 in cross section.

As shown in FIG. 7, the operation buttons 9 of the operation unit 8 are formed integrally of a plastic sheet 20. The operation unit 8 also has a sheet 22 for detecting when the user's finger or the like contacts the sheet 20. The sheets 20, 22 are attached to a cover member of the housing 2. A circuit board 21 for controlling the operation unit 8 is supported on a support 25 and positioned beneath the sheets 20, 22. The circuit board 21 and the sheet 22 are bonded to each other by a double-sided tape 26 or the like.

Figure 8:
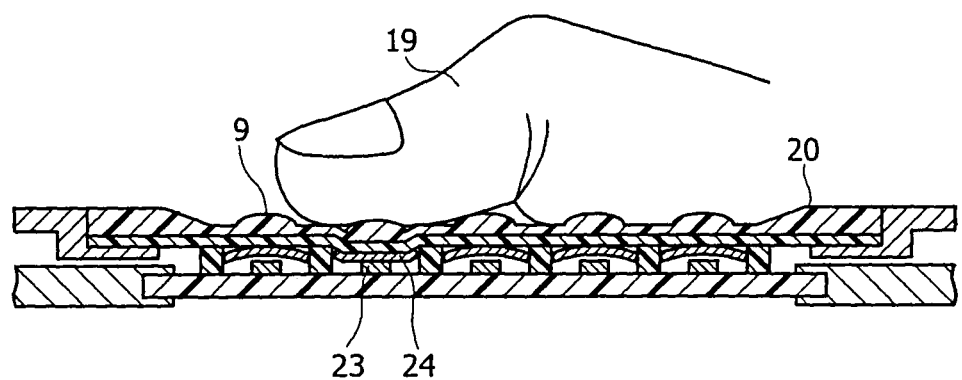
FIG. 8 is a cross-sectional view of the operation unit with an operation button pressed by the user.

Electrodes 24 are disposed beneath the sheet 22 in association with the operation buttons 9, respectively. Interconnects 23 associated respective with the electrodes 24 are disposed on the circuit board 21. The electrodes 24 and the interconnects 23 jointly make up contact switches. The electrodes 24 or the interconnects 23 are connected to a controller, not shown, for controlling the operation unit 8. While a voltage having a predetermined value is being applied to the electrodes 24 or the interconnects 23, when one of the operation buttons 9 is pressed by the thumb 19 of the user or the like as shown in FIG. 8, the switch corresponding to the pressed operation button 9 is turned on, and the controller determines which one of the operation buttons 9 is pressed based on a signal from the switch. Each of the electrodes 24 is cup-shaped, for example, making itself resilient enough to spring back to the position shown in FIG. 7 when the corresponding operation button 9 is released. Alternatively, each of the electrodes 24 may not be resilient by itself, and may be combined with a spring, a rubber cup, or the like to cause the electrode 24 to return to the position shown in FIG. 7 when the corresponding operation button 9 is released.

Figure 9:
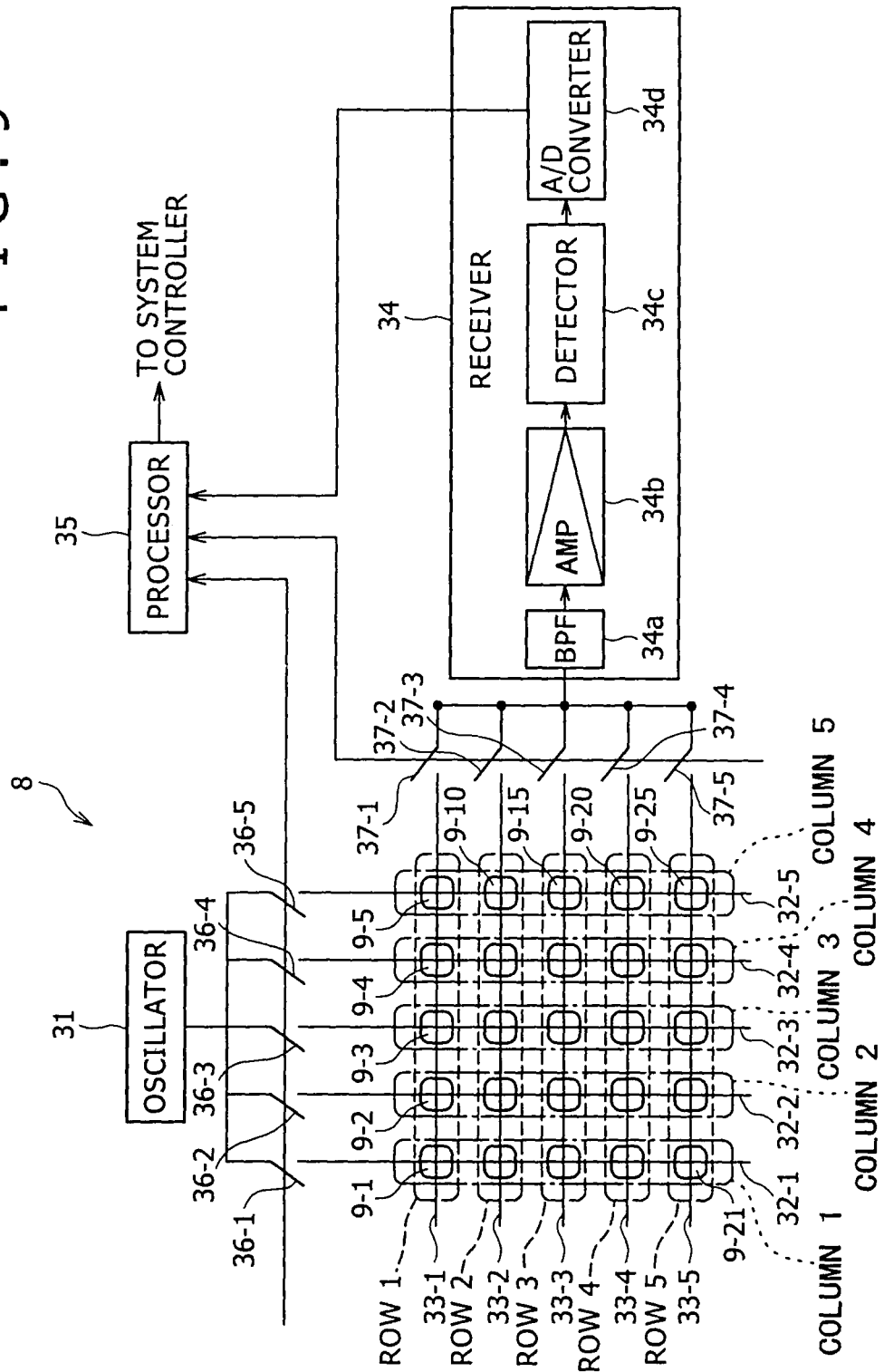
FIG. 9 is a circuit diagram, partly in block form, of the operation unit.

FIG. 9 shows the operation unit 8 in circuit diagram, partly in block form.

As shown in FIG. 9, the operation unit 8 has a plurality of linear sending electrodes 32-1 through 32-5, an oscillator 31 for supplying the linear sending electrodes 32-1 through 32-5 with AC electric power having a predetermined frequency of 100 kHz, for example, a plurality of linear receiving electrodes 33-1 through 33-5 for receiving alternating currents from the sending electrodes 32-1 through 32-5 through an electrostatic action, a receiver 34 for receiving alternating currents flowing in the receiving electrodes 33-1 through 33-5, and a processor 35 for receiving an output signal from the oscillator 31, output signals from the receiving electrodes 33-1 through 33-5, and an output signal from the receiver 34.

The sheet 22 supports thereon a plurality of switches 36-1 through 36-5 between the oscillator 31 and the sending electrodes 32-1 through 32-5, and a plurality of switches 37-1 through 37-5 between the receiving electrodes 33-1 through 33-5 and the receiver 34. The switches 36-1 through 36-5 and the switches 37-1 through 37-5 are turned on at predetermined times, e.g., times when the oscillator 31 outputs an alternating current.

The receiver 34 includes an amplitude modulator having a bandpass filter (BPF) 34a for passing an alternating current therethrough only in a predetermined frequency range, an amplifier 34b, and a detector 34c, and an A/D converter 34d for converting an analog detected output signal from the amplitude modulator into a digital signal.

The receiving electrodes 33-1 through 33-5 are arranged so as to extend substantially perpendicularly to the sending electrodes 32-1 through 32-5, but kept out of contact with the sending electrodes 32-1 through 32-5 at their crossing points. Stated otherwise, capacitors are formed at the crossing points between the sending electrodes 32-1 through 32-5 and the receiving electrodes 33-1 through 33-5. When the oscillator 31 generates and outputs an alternating current to the sending electrodes 32-1 through 32-5, an alternating current flows through the crossing points (capacitors) into the receiving electrodes 33-1 through 33-5 by way of electrostatic induction.

Specifically, when the oscillator 31 applies an AC voltage to the sending electrodes 32-1 through 32-5, an alternating current is generated in the receiving electrodes 33-1 through 33-5 based on capacitive coupling due to the electrostatic capacitance of the capacitors between the sending electrodes 32-1 through 32-5 and the receiving electrodes 33-1 through 33-5, and supplied to the receiver 34.

The receiver 34 outputs the intensity of the alternating current supplied through the capacitors as a digital signal to the processor 35. The intensity of the alternating current supplied through the capacitors to the receiver 34 depends only upon the electrostatic capacitance of the capacitors. The electrostatic capacitance of the capacitors is static and is of a fixed value unless the sending electrodes 32-1 through 32-5 and the receiving electrodes 33-1 through 33-5 are deformed. Therefore, as long as the same AC voltage is applied to the sending electrodes 32-1 through 32-5, the intensity of the alternating current supplied through the capacitors to the receiver 34 remains to be of a constant value.

When a living body (user's finger or the like) approaches the crossing point between one of the sending electrodes 32-1 through 32-5 and one of the receiving electrodes 33-1 through 33-5, the electrostatic capacitance of the capacitor at the crossing point changes. Specifically, since the living body is regarded as a hypothetical ground, when an AC voltage is applied to the sending electrode, the intensity of an AC voltage that is received by the corresponding receiving electrode through the capacitor and supplied to the receiver 34 is reduced by a value commensurate with a current that flowing into the ground (living body).

Based on the above phenomenon, the processor 35 determines whether a living body approaches the crossing points between the sending and receiving electrodes or not or measures how close a living body approaches the crossing points, i.e., the distance between a living body and the crossing points, using a received signal that is amplitude-modulated by the amplitude modulator of the receiver 34 and converted into a digital signal by the A/D converter 34d.

If the matrix of operation buttons 9 includes a plurality of operation buttons 9-1 through 9-25 disposed respectively over the crossing points between the sending electrodes 32-1 through 32-5 and the receiving electrodes 33-1 through 33-5, then when the user's finger touches an operation button 9-i, i.e., one of the operation buttons 9-1 through 9-25, the processor 35 detects that the living body approaches the operation button 9-i, i.e., the crossing point disposed beneath the operation button 9-i, and supplies a detected signal to the CPU 101.

The operation unit 8 differently produces a detected signal representing a state wherein the user's finger touches the sheet 20 (a "touch" state as described later) and a detected signal representing a state wherein one of the operation buttons 9-1 through 9-25 is pressed (a "pressed" state as described later).

In FIG. 9, the operation buttons 9-1 through 9-25 are arranged in a matrix of five rows and five columns, and the five sending electrodes 32-1 through 32-5 and the five receiving electrodes 33-1 through 33-5 are disposed respectively below the operation buttons 9-1 through 9-25. However, the number of sending electrodes and the number of receiving electrodes are not limited any values. It is preferable that the crossing points between the sending electrodes and the receiving electrodes be disposed beneath the respective operation buttons.

In FIG. 9, furthermore, the angles formed between the sending electrodes 32-1 through 32-5 and the receiving electrodes 33-1 through 33-5 at the crossing points are essentially 90°. However, those angles are not limited to 90°. The sending electrodes and the receiving electrodes may be arranged in any layout insofar as they are kept out of contact with each other and form crossing points therebetween.

A basic process of operating the operation unit 8 will be described below.

Eight actions are defined as ways of moving the user's finger on the operation unit 8, as follows:

1. "TOUCH": an action to bring the finger from a state out of contact with the sheet 20 (hereinafter referred to as "operation button 9") into contact with an operation button 9.

2. "LONG TOUCH": an action to keep the finger in contact with an operation button 9 for a certain period of time after the finger has been brought into contact with the operation button 9.

3. "MOVE": an action to move the finger, while being kept in contact with either one of the 25 operation buttons 9, to another operation button, i.e., an action to move the finger from a certain location on the sheet 20 to another location on the sheet 20.

4. "PRESS": an action to press either one of the operation buttons 9, i.e., an action to electrically connect one of the electrodes 24 to one of the electrodes 23.

5. "LONG PRESS": an action to keep either one of the 25 operation buttons 9 pressed by the finger for a certain period of time.

6. "DRAG": an action to move the finger, while pressing either one of the 25 operation buttons 9, to another operation button, i.e., an action to move the finger while pressing either one of the 25 operation buttons 9 during the course of travel.

7. "RELEASE": an action to release the finger from pressing an operation button 9, i.e., an action to keep the finger in touch with an operation button 9.

8. "REMOVE": an action to lift the finger off an operation button 9.

The above eight actions are chiefly used in the following occasions:

The action "TOUCH" is used to "select", i.e., "focus" on, one of a plurality areas (items) on a displayed image when navigation buttons, playback control buttons, and context buttons, to be described later, are displayed on the display unit 7.

The action "PRESS" is used to "determine" a selected item from the action "TOUCH".

The action "LONG TOUCH" is used to scroll a displayed image upwardly or downwardly. The scrolling action can be controlled by a navigation button. The action "LONG TOUCH" is performed for a period of time which ranges preferably, but not necessarily, from 0.5 to 1 second, for example.

The action "MOVE" is used to move from a touched and "selected" item to another item to be "selected".

The action "LONG PRESS" is used to perform a trick play mode such as "FAST-FORWARD" or "REWIND" with a playback control button or to display context buttons on the display unit 7. The action "LONG PRESS" is performed for a period of time which ranges preferably, but not necessarily, from 0.5 to 1 second, for example.

The action "DRAG" is used to displace the finger off an operation button 9 being pressed when the operation button 9 is to be canceled.

The action "REMOVE" is used to cancel a touched and "SELECTED" item.

The action "RELEASE" is used to kick a pressed "DETERMINE" command. Specifically, the "DETERMINE" command is executed for the first time when the action "RELEASE" is performed. After the "DETERMINE" command is executed, the portable electronic device 1 does not operate even when the finger is released, i.e., moved, from the operation button 9.

Images that are displayed on the display unit 7 by the portable electronic device 1 will be described below.

Figure 10:
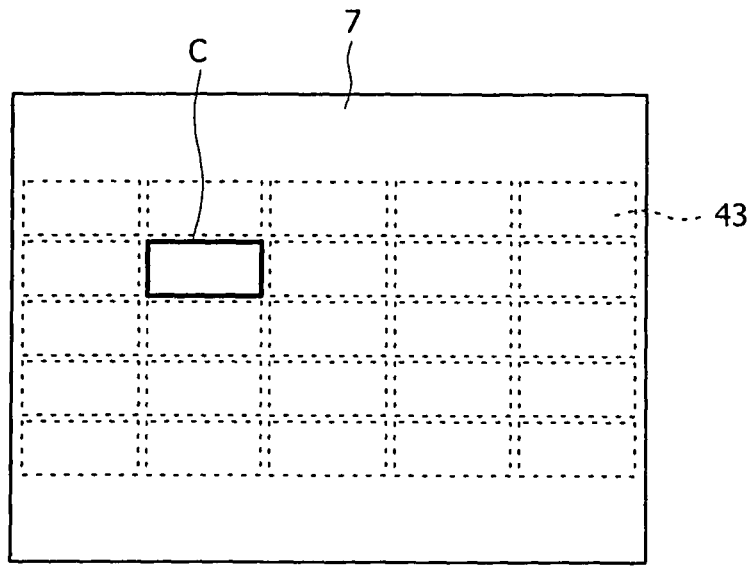
FIG. 10 is a view showing an image displayed on a display unit.

FIG. 10 shows an image displayed on the display unit 7. The displayed image includes items (areas) 43 to be selected and determined by the user, the items (areas) 43 being associated respectively with the operation buttons 9 of the operation unit 8. The user operates the operation unit 8 to move a cursor C in the displayed image to select and determine a desired item.

Figure 12:
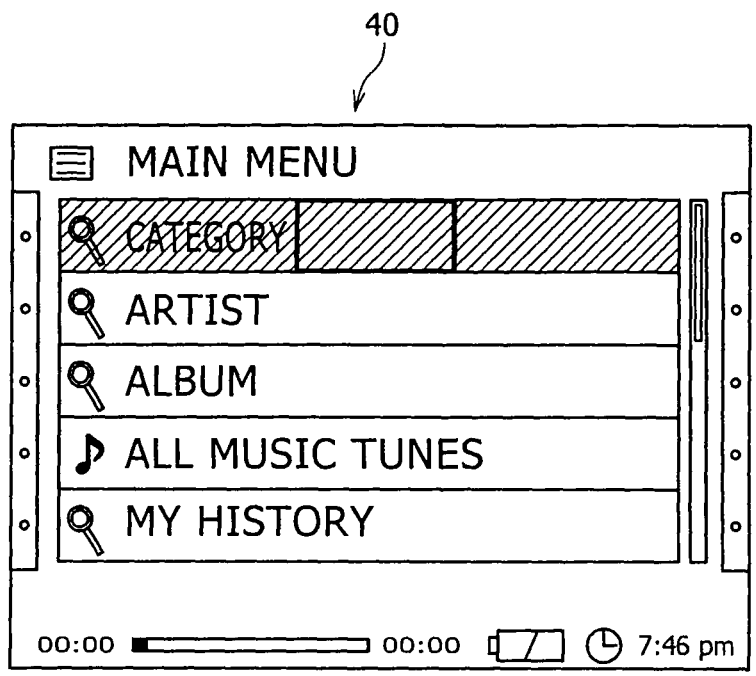
FIG. 12 is a view showing an action in the main menu image.
Figure 13:
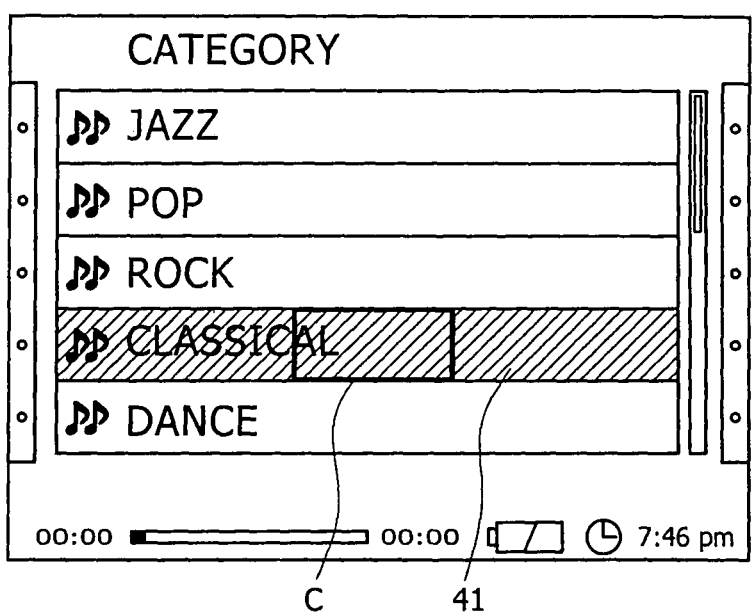
FIG. 13 is a view showing an action in a category image.
Figure 14:
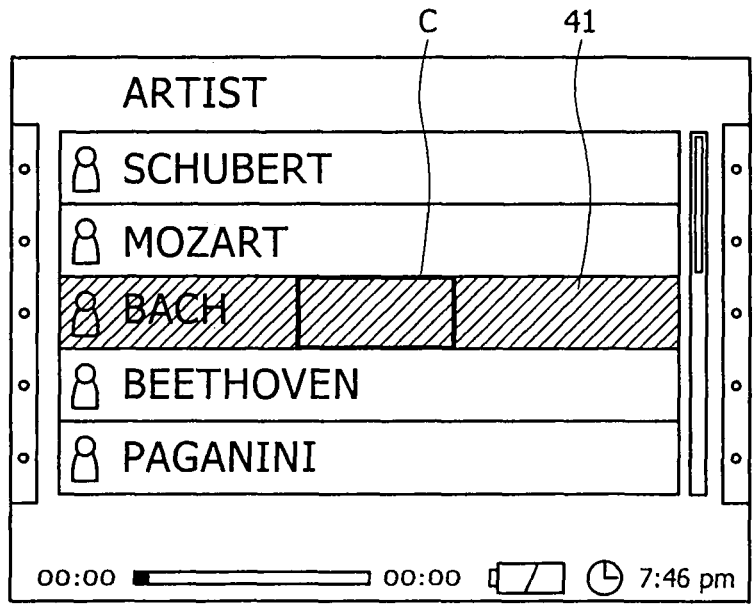
FIG. 14 is a view showing an action in an artist image.
Figure 15:
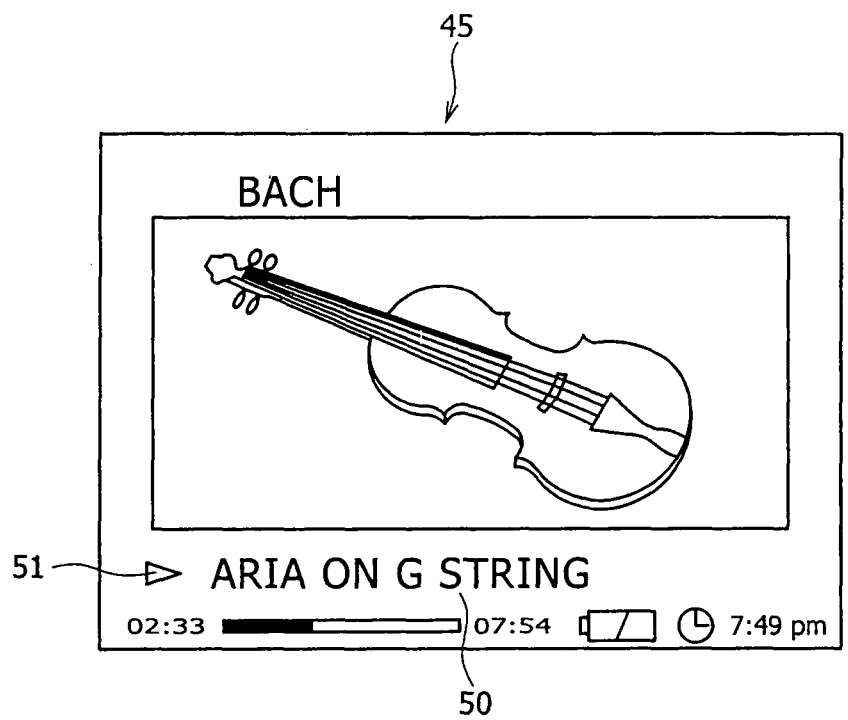
FIG. 15 is a view showing a reproduced image.
Figure 18:
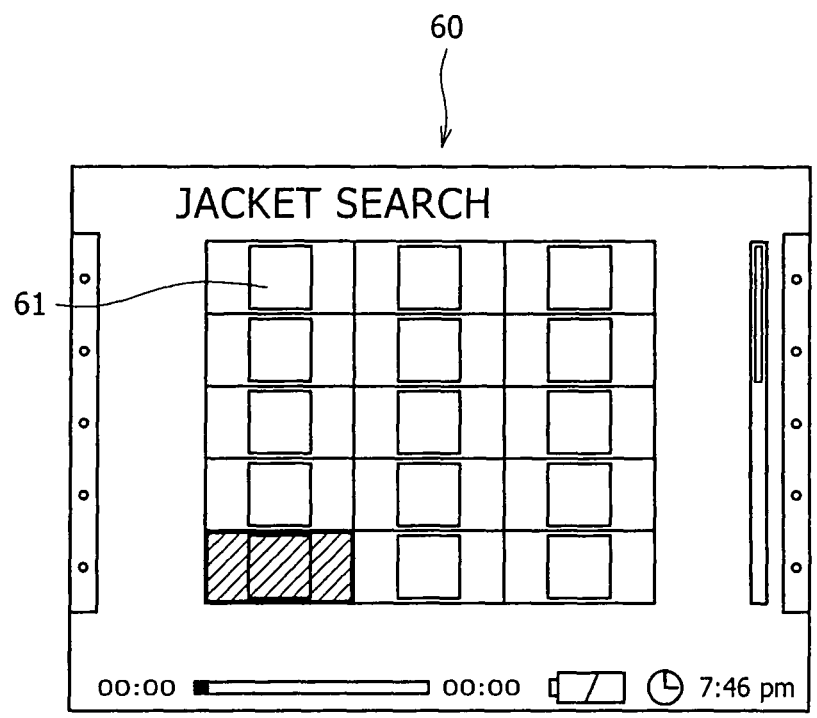
FIG. 18 is a view showing a jacket search image.

There are three basic images that are displayed on the display unit 7 by the portable electronic device 1. These three basic images include (1) a reproduced image (JPEG image) as shown in FIG. 15, (2) list selection images (a main menu image, a search image, a program playback list image, a setting image, etc.) as shown in FIGS. 12 through 14, and (3) a matrix selection image (album jacket search image, etc.) as shown in FIG. 18.

There are three basic button images that are displayed on the display unit 7 by the portable electronic device 1. These three basic button images include (a) navigation buttons, (b) playback control buttons, and (c) context buttons.

The navigation buttons are used in all of the (1), (2), and (3) images referred to above. The navigation buttons include a button for selecting the reproduced image, the main menu image, and the other images, a button for rearranging music tunes displayed in an image in alphabetical order, in order of user's preference, etc., a button for going to an image next to the presently displayed image, a button for returning to an image preceding the presently displayed image, and other buttons.

The playback control buttons are displayed in the (1) reproduced image, for example. The playback control buttons include buttons for playing back a cued music tune, fast-forwarding a music tune, reversing a music tune, and skipping a music tune and going to a next music tune while the music tune is being played back.

The context buttons are buttons displayed in the (2) list selection images and the (3) matrix selection image. The context buttons include a button for adding music to a program playback list. In a program playback list image, the context buttons include a button for removing a music tune from the program playback list and a button for replacing a music tune.

Each of the list selection images contains objects (items) to be selected that are divided in areas that are defined by rows only. The matrix selection image contains objects (items) to be selected that are divided in areas that are defined by rows and columns. Though the list selection images and the matrix selection image contain different displayed items, they are similar to each other in that an item is selected and determined to play back a music tune, and an item is selected to display context buttons to generate a program playback list, etc.

A program playback list allows the user to add music tunes that the user wants to listen to an existing playback list, also allows the user to listen to the music tunes in order of the program playback list. There are five program playback lists 1 through 5 that are can be registered. Of the list selection images, a setting image allows the user to select and determine one of the five program playback lists 1 through 5.

Basic operation of the portable electronic device 1 will be described below. First, a process of playing back music on the portable electronic device 1 will be described below.

Figure 11:
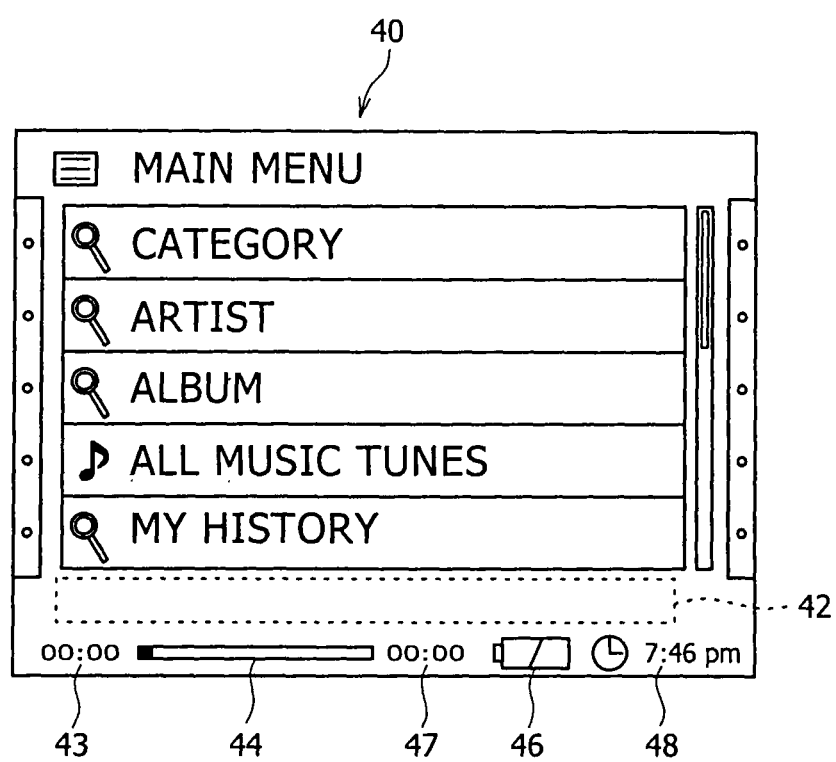
FIG. 11 is a view showing a main menu image.

When the user slides the power switch 3 to turn on the power supply of the portable electronic device 1, the system controller 100 activates the system, displays a predetermined startup image, and thereafter displays a main menu image 40 shown in FIG. 11 on the display unit 7. The main menu image 40 contains items including "CATEGORY", "ARTIST", "ALBUM", "ALL MUSIC TUNES", . . . , and displays other items when it is scrolled downwardly. The main menu image 40 allows the user to search for a desired music tune in a hierarchical manner by category, album, or the like.

The main menu image 40 includes in its lower section a time counter 43 for indicating the time count of a music tune being played back, a total time indicator 47 for indicating the total time of a selected music tune, a bar 44 for indicating the elapsed time of the total time of a music tune being played back, a remaining battery capacity 46, a present time indicator 48. If a music tune is being played back when the main menu image 40 is displayed, then the title of the music tune is displayed in a blank box 42 in the main menu image 40.

The user can select an item in the main menu image 40 by pressing either one of the operation buttons 9 in the first through five rows and the second through fourth columns of the operation unit 8 shown in FIG. 9. Since the second through fourth columns are not distinguished one from another in a list selection image such as the main menu image 40, the user may select either one of the second through fourth columns.

It is assumed, for example, that the user will search for a music tune from "CATEGORY". When the user touches either one of the operation buttons 9 in the first row and the second through fourth columns, e.g., the operation button 9-3 in the first row and the third column, the display controller 106 applies a color 41 to the item "CATEGORY", as shown in FIG. 12. The display controller 106 also brings the cursor C to the item "CATEGORY".

If the user long touches the fifth row corresponding to the item "MY HISTORY" in the main menu image 40, then the main menu image 40 scrolls downwardly to lower items.

When the user presses and then releases operation button 9-3, the item "CATEGORY" is determined. The display controller 106 displays an image shown in FIG. 13. When the user touches, presses, and releases the operation button 9-18 in the fourth row and the third column, "CLASSICAL" is determined. The display controller 106 now displays an image shown in FIG. 14. In this manner, the user repeats the searching action downwardly in the hierarchical search system until "BACH" and "ARIA ON G STRING" are selected and determined, whereupon the display controller 106 displays a reproduced image 45 shown in FIG. 15. The CPU 101 outputs a signal for playing back a music tune "ARIA ON G STRING" to the DMA controller 102, which transfers the music data according to the DMA transfer process to the audio decoder 108. The audio decoder 108 decodes the music data for playing back the music tune.

In the above search process, the user may not necessarily keep the finger in touch with the operation unit 8 at all times. Even if the user in the meantime has the finger removed from and touching an operation button 9 again, or touching an operation button 9 different from the last operation button 9 that the user has touched, only an item that is focused on or a cursor is displayed.

The reproduced image 45 shown in FIG. 15 contains an image 49 in the JPEG format, a music title 50, and a mark 51 indicating that the music tune is being played back. The image 49 is one of images that are recorded in the HDD 115 which are classified by music tunes, albums, artists, or categories. The image 49 may be an image that is downloaded from the Internet into a PC by the user and read into the portable electronic device 1 or an image captured into a digital camera or the like by the user and read into portable electronic device 1. If there is no input action made on the operation unit 8 by the user for a predetermined period of time while a music tune is being played back, then the display unit 7 may display an image such as a screensaver image.

The navigation buttons will be described below. If the user who wants to listen to "CLASSICAL" in the image "CATEGORY" shown in FIG. 13 selects and determines "ROCK" by mistake and the image changes to the image "ARTIST" shown in FIG. 14, then the user makes the following action in order to return to the image "CATEGORY" shown in FIG. 13: The user touches either one of the operation buttons 9-1, 9-6, 9-11, 9-16, 9-21 in the first column of the operation unit 8. Then, the display controller 106 displays navigation buttons 55 shown in FIG. 16. The navigation buttons 55 include a button 55a for displaying an up image that is not currently displayed on the display unit 7, a button 55b for going to a reproduced image, a button 55c for returning to a preceding image, a button 55d for changing the order of (sorting) items in list selection images or the like, and a button 55e for displaying a down image that is not currently displayed on the display unit 7. These five navigation buttons correspond respectively to the operation buttons 9-1, 9-6, 9-11, 9-16, and 9-21.

Figure 16:
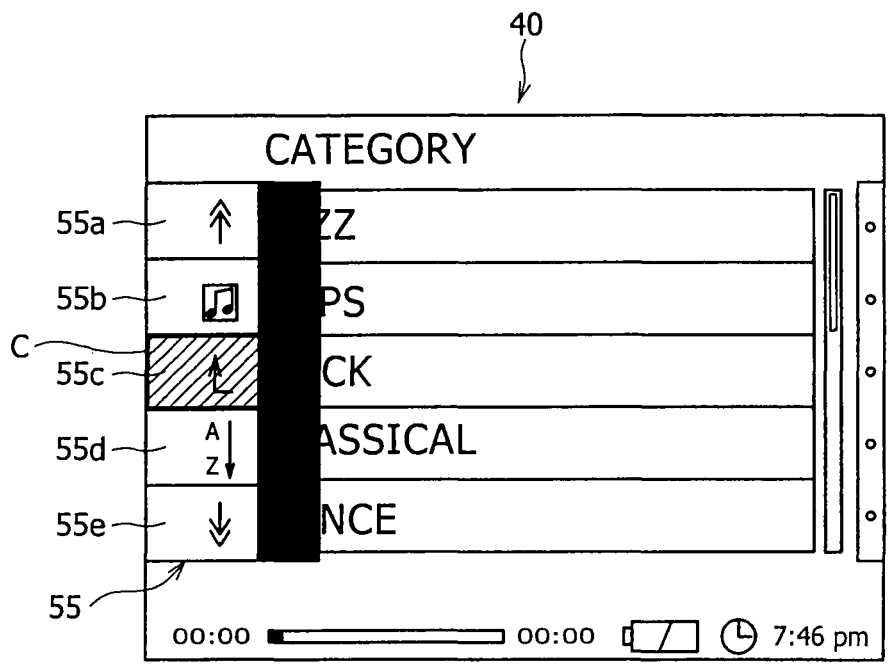
FIG. 16 is a view showing navigation buttons.

When the navigation buttons 55 are displayed and the user touches the button 9-11 in the third row and the first column, or when the user touches either one of the operation buttons 9-1, 9-6, 9-11, 9-16, 9-21 to display the navigation buttons 55 and then moves the finger to the operation button 9-11 without removing the finger (the user does not need to move the finger if the user initially touches the operation button 9-11 to display the navigation buttons 55), the display controller 106 brings the cursor C to the corresponding item. When the user presses and releases the operation button 9-11, the displayed image changes back to the preceding image "CATEGORY" shown in FIG. 13. At this time, the display controller 106 keeps the navigation buttons 55 displayed on the image "CATEGORY", as shown in FIG. 16. Thereafter, the user touches, presses, and releases the operation button 9-18 in the fourth row and the third column or the operation button 9-17 in the fourth row and the second column or the operation button 9-19 in the fourth row and the fourth column, determining "CLASSICAL". The display controller 106 now eliminates the navigation buttons 55 from the display unit 7. Thereafter, the display controller 106 displays the image shown in FIG. 14 and the image shown in FIG. 15, whereupon the desired music tune is played back.

The navigation buttons 55 can also be displayed on the reproduced image 45 shown in FIG. 15, allowing the user to move to another image or select and play back another music tune while the presently selected music tune is being played back.

Figure 17:
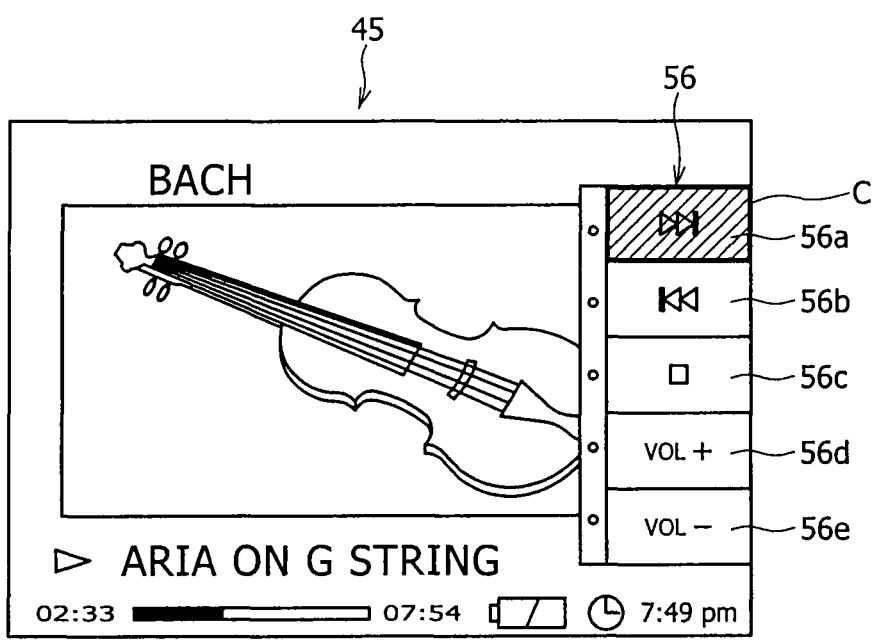
FIG. 17 is a view showing playback control buttons.

An action to perform the trick play mode while a music tune is being played back will be described below. When the user touches either one of the operation buttons 9-5, 9-10, 9-15, 9-20, 9-25 in the fifth column of the operation unit 8 while the reproduced image 45 is being displayed, the display controller 106 displays playback control buttons 56 as shown in FIG. 17. The playback control buttons 56 include a fast-forward button 56a, a rewind button 56b, a stop button 56c, a volume button 56d, and a volume button 56e. These five playback control buttons 56 correspond respectively to the operation buttons 9-5, 9-10, 9-15, 9-20, and 9-25.

When the playback control buttons 56 are displayed and the user touches the button 9-5 in the first row and the fifth column, or when the user touches either one of the operation buttons 9-5, 9-10, 9-15, 9-20, 9-25 to display the playback control buttons 56 and then moves the finger to the operation button 9-5 without removing the finger (the user does not need to move the finger if the user initially touches the operation button 9-5 to display the playback control buttons 56), the display controller 106 brings the cursor C to the corresponding item. When the user long presses the operation button 9-5, the CPU 101 fast-forwards the presently played back music tune while playing back the music tune. When the CPU 101 fast-forwards the presently played back music tune, it may play back intermittent ones of successive packets of the stream of the data of the music tune. Similarly, when the CPU 101 reverses the presently played back music tune, it may play back intermittent ones of successive packets of the stream of the data of the music tune.

When the user presses and then releases the operation button 9-5, rather than long pressing the operation button 9-5, the CPU 101 stops playing back the music tune that is presently played back, and plays back a next music tune in the album which contains the music tune that is presently played back, or plays back a next music tune in the program playback list which contains the music tune that is presently played back.

FIG. 18 shows a jacket search image 60 by way of example. In the jacket search image 60, the user can select items in the first through fifth rows and the second through fourth columns. The items represent jacket images 61 such as of album CDs of vocal songs or the like, for example. When the user selects and determines, i.e., touches, presses, and releases, one of the jacket images 61, the display controller 106 displays an image (not shown) of a list of music tunes contained in the determined album. When the user selects and determines, i.e., touches, presses, and releases, a desired one of the music tunes from the displayed list image, the system controller 100 plays back the determined music tune. Alternatively, when the user selects and determines one of the albums 61 in the jacket search image 60, the system controller 100 may play back the music tunes, successively from the first music tune, contained in the album.

A process of controlling the operation unit 8 according to the operation unit control program 125 will be described below.

As described above, the operation unit 8 detects contact by the user's finger and the position of the contacted area of the operation unit 8 based on an electrostatic capacitance change. Specifically, the operation unit 8 detects the coordinates of a spot where the electrostatic capacitance change is greatest in an area contacted by the user's finger, as the coordinates of a contact point of the user's finger. The coordinates of the spot where the electrostatic capacitance change is greatest are essentially the coordinates of the center of gravity of the area contacted by the user's finger.

Since the human finger has the highest sensitivity at its fingertip, the user tends to touch the operation buttons 9 of the operation unit 8 with the fingertip. If the user is to operate each of all the operation buttons 9 with the thumb on the portable electronic device 1 according to the present embodiment, then the angle of the thumb and the area of the area contacted by the thumb vary depending on the position of the operation button 9, and the operation button 9 may actually be contacted by the finger cushion of the thumb though the user may be thinking that the operation button 9 is not contacted by the finger cushion.

Therefore, the coordinates of a contact spot desired by the user, i.e., a spot on each of the operation buttons 9, and the coordinates of the center of gravity that is actually detected by the operation unit 8 are likely to deviate from each other.

Figure 19:
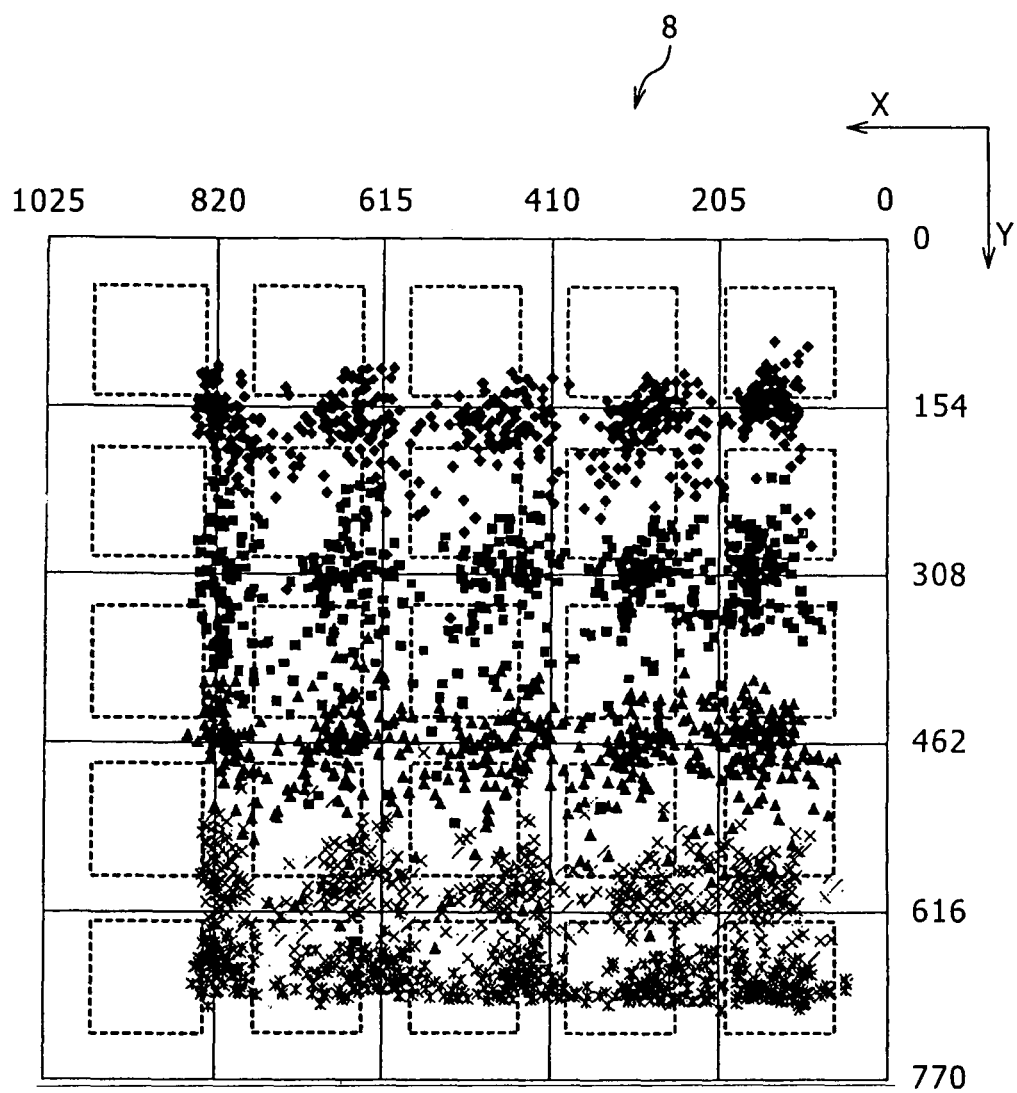
FIG. 19 is a view showing sampled data representative of coordinates that are detected when a plurality of users operate the operation unit.

FIG. 19 shows sampled data representative of coordinates that are detected when a plurality of users operate the operation unit 8.

In FIG. 19, the coordinates that are detected in an XY coordinate system having its origin (0, 0) located at the upper right corner of the operation unit 8 when the operation unit 8 is operated by the user's right thumb while the portable electronic device 1 is being held by the user as shown in FIG. 4 are sampled for each of the 25 operation buttons 9 of the operation unit 8. In the XY coordinate system, the operation unit 8 is capable of outputting signals representing X coordinates ranging from 0 to 1025 and Y coordinates ranging from 0 to 770 as coordinates where the electrostatic capacitance change is greatest.

As shown in FIG. 19, the coordinates of spots on the operation buttons 9 desired by the user and the actually detected coordinates deviate more from each other and more contact spots off the operation buttons 9 are detected as the operation buttons 9 are spaced more from the thumb. Such coordinate deviations are larger as the X coordinates are greater and as the Y coordinates are smaller. Consequently, even though the user intends to touch the operation buttons 9, areas out of the operation buttons 9 are actually detected, and the cursor is prevented from being accurately displayed on the display unit 7.

According to the present embodiment, the above deviations are corrected by the operation unit control program 125.

Specifically, the operation unit control program 125 filters the above sampled data according to a polynomial approximation process, transforming the coordinates of a detected spot into the coordinates of a spot that is desired to be contacted by the user. The polynomials used in the polynomial approximation process may be linear polynomials (linear filter) or polynomials of higher degree (nonlinear filter) such as quadratic polynomials.

If coordinates that are actually detected by the operation unit 8 are represented by (x, y) and transformed coordinates by (X, Y), then the transformed coordinates (X, Y) may be approximated by linear polynomials as follows:

$X=ax+b$ $Y=cx+d$, and the transformed coordinates (X, Y) may be approximated by quadratic polynomials as follows:

$X=ax^2+bx+c$ $Y=dy^2+ey+f.$

Generally, polynomials of higher degree make it possible to better approximate transformed coordinates, but need a greater amount of calculations. It is thus preferable to use quadratic polynomials for approximation.

Figure 20:
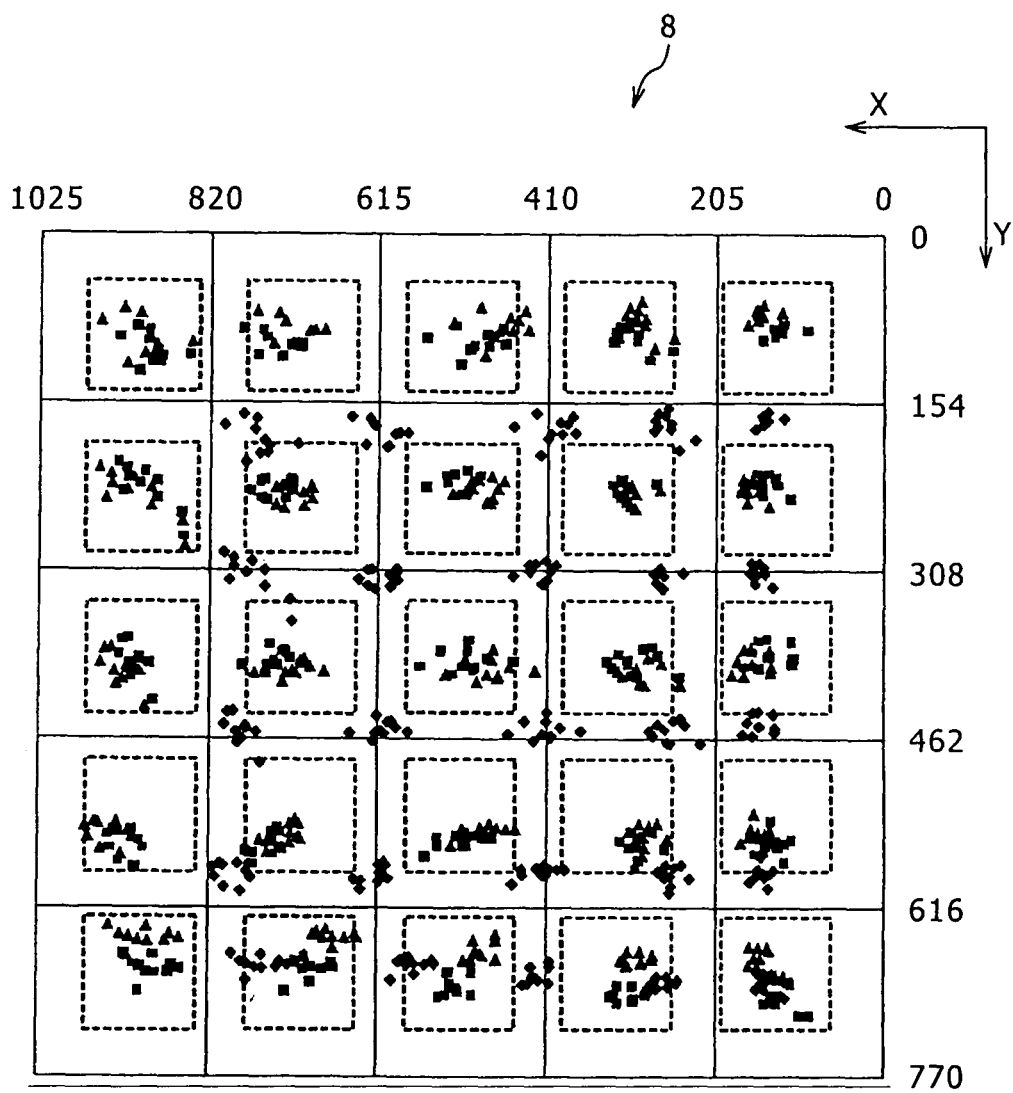
FIG. 20 is a diagram showing coordinates that are actually detected by the operation unit and transformed coordinates when the coordinates are approximated by linear polynomials.

FIG. 20 shows coordinates that are actually detected by the operation unit 8 and transformed coordinates when the coordinates are approximated by linear polynomials. As shown in FIG. 20, the coordinates are transformed such that they are positioned essentially on all the operation buttons 9. Therefore, the above coordinate transformation makes it possible to display the cursor in a manner to accurately reflect an intended action that the user has made to touch the operation unit 8 naturally without paying attention to the above coordinate deviations. Furthermore, once the coefficients of the polynomials are determined, they will be used for subsequent coordinate transformation. Accordingly, the load imposed on the CPU 101 for coordinate transformation is relatively low.

Figure 21A:
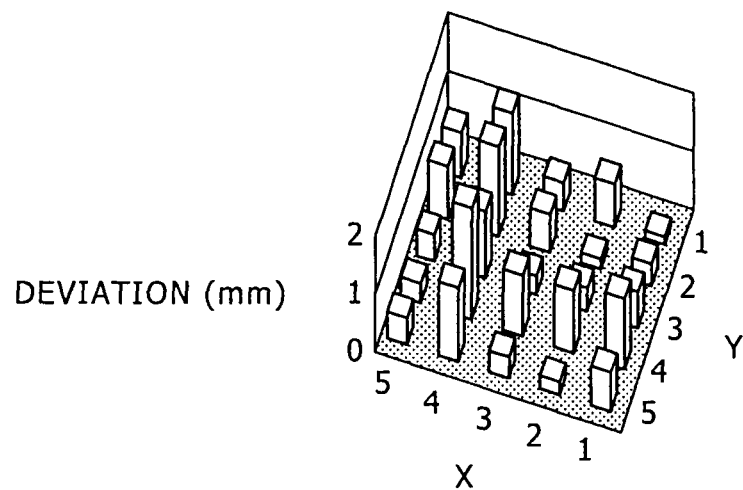
FIGS. 21A and 21B are diagrams showing the relationship between the transformed coordinates and deviations of coordinates of the centers of the areas of the operation buttons when the coordinates are approximated by quadratic polynomials and linear polynomials.
Figure 21B:
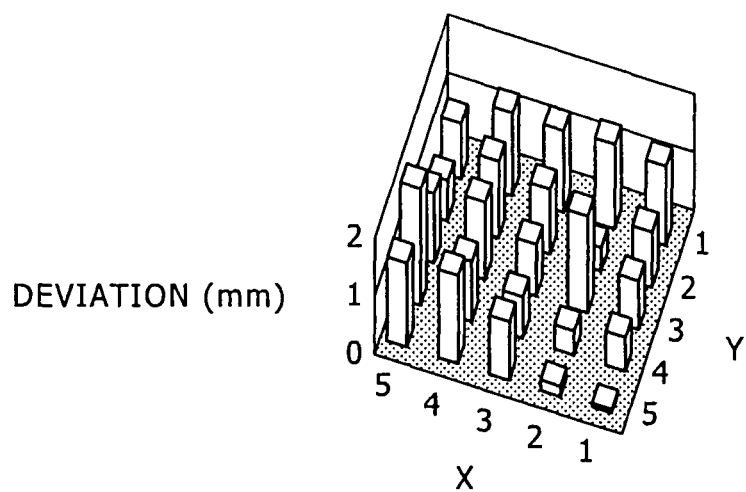

FIGS. 21A and 21B show the relationship between the transformed coordinates and deviations of coordinates of the centers of the areas of the operation buttons when the coordinates are transformed by the quadratic polynomials (quadratic nonlinear filter) and the linear polynomials (linear filter).

As shown in FIGS. 21A and 21B, the coordinate deviations fall within a range up to about 1.5 mm, indicating that the coordinate transformation is effective. The coordinate deviations that occur after the coordinate transformation using the quadratic nonlinear filter are smaller than the coordinate deviations that occur after the coordinate transformation using the linear filter. In the present embodiment, each of the operation buttons 9 has an area having sides each about 3.5 mm long. Irrespective of whether the quadratic nonlinear filter or the linear filter is used, the actually detected coordinates are transformed essentially into coordinates on the operation buttons 9. Consequently, coordinate deviations on the operation buttons 9 can be corrected to allow the cursor to accurately reflect user's intended actions on the operation unit 8.

Another process of controlling the operation unit 8 according to the operation unit control program 125 will be described below.

As described above, the operation unit 8 detects which operation button 9 is contacted by the user based on a change in the electrostatic capacitance of the capacitor disposed below each of the operation buttons 9. Specifically, the operation unit 8 is divided into 25 areas associated respectively with the operation buttons 9 in the XY coordinate system of the operation unit 8, and the operation unit 8 determines which operation button 9 is contacted by the user depending on which area the coordinates of a spot where the electrostatic capacitance change is greatest belong to.

In the borders between the areas associated respectively with the operation buttons 9, it may not be determined which area the coordinates of a spot where the electrostatic capacitance change is greatest belong to because of fluctuations of the user's finger, slight changes in the electrostatic capacitance, or chattering. As a result, although not intended by the user, the cursor displayed on the display unit 7 may frequently move between areas 43, or the cursor may frequently repeatedly be displayed and undisplayed in the border between the 25 areas 43 and an out-of-area zone outside of the 25 areas 43.

According to the present invention, the operation unit control program 125 provides a hysteresis in the borders between the areas in order to eliminate such fluctuations in those borders. The hysteresis refers to different borders encountered when the user's finger moves between areas, e.g., area of the operation button and the area of the operation button 9-2, for the action "MOVE" and the action "DRAG", i.e., when the user's finger moves from the area of the operation button to the area of the operation button 9-2 and when the user's finger moves from the area of the operation button to the area of the operation button 9-1.

Specific details of a process of providing a hysteresis for eliminating fluctuations in the borders will be described below.

Figure 22:
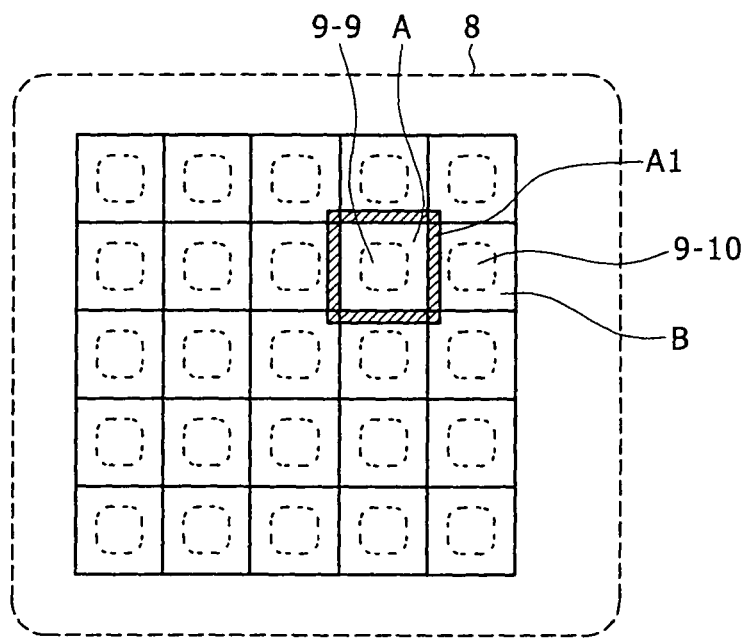
FIG. 22 is a view showing a hysteresis developed when the finger is moved from an area A to an area B.

FIG. 22 shows a hysteresis provided when the user's finger moves from an area A to an area B of the 25 areas corresponding to the respective operation buttons 9.

As shown in FIG. 22, while the operation unit 8 is detecting the user's finger kept in touch with the area A of the operation button 9-9, when the user's finger moves or drags from the area A to the area B of the operation button 9-10, the operation unit control program 125 provides a hypothetical frame area (hereinafter referred to as "hysteresis") A1 disposed outside of and surrounding the area A. Even if the operation unit 8 detects when the user's finger moves out of the area A toward the area B, the operation unit control program 125 regards the user's finger as remaining in touch with the area A unless the user's finger moves beyond the hysteresis A1 of the area A. When the user's finger moves beyond the hysteresis A1 and reaches part of the area A which is not in the hysteresis A1, the operation unit control program 125 regards the user's finger as having moved into the area B.

Specifically, once the user's finger touches the area A, when the user's finger moves from the area A toward the area B, the area A is increased in extent by the hysteresis, and when the user's finger moves from the area B toward the area A, the area B is increased in extent by the hysteresis. In this manner, the border between those adjacent area is changed by the hysteresis when the user's finger moves from one of the areas to the other.

Figure 23:
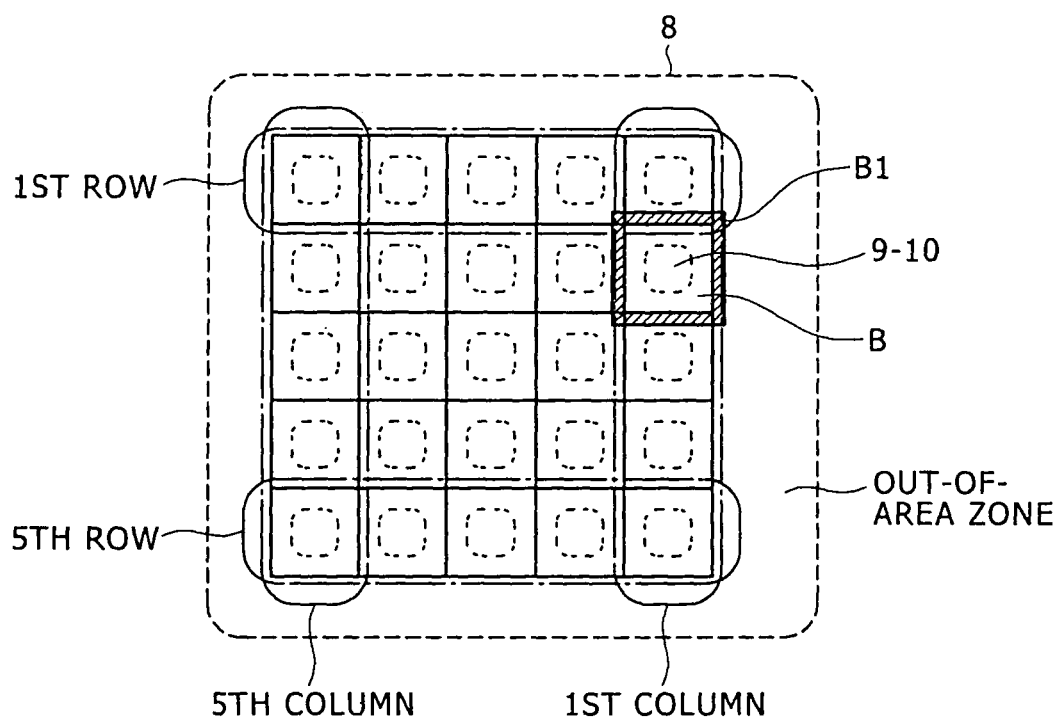
FIG. 23 is a view showing a hysteresis developed when the finger is moved from the area B into an out-of-area zone.
Figure 24:
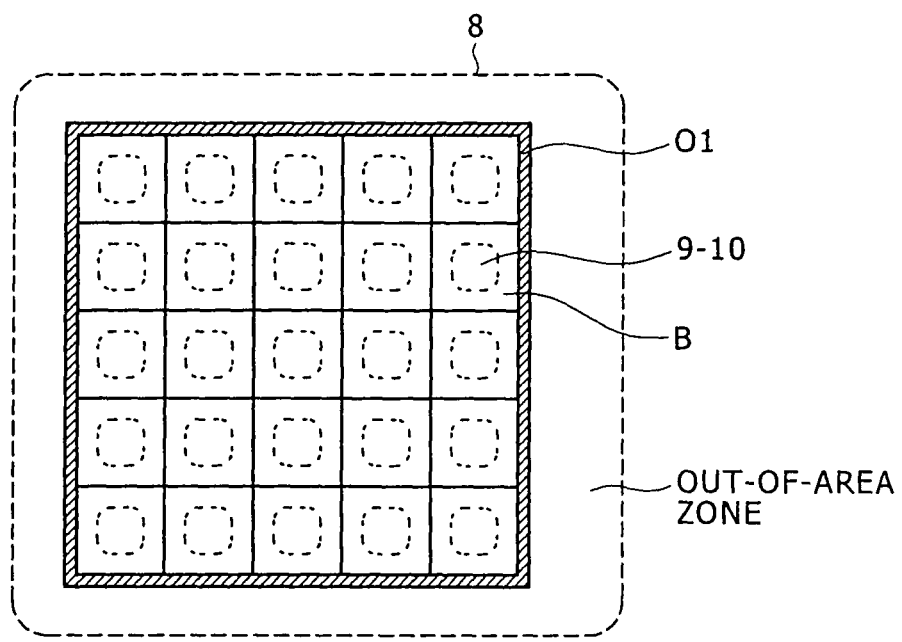
FIG. 24 is a view showing a hysteresis developed when the finger is moved from the out-of-area zone into the area B.

As shown in FIG. 23, when the user's finger moves from either one of the areas in the first and fifth columns and the first and fifth rows (it is assumed that the columns and the rows are counted successively from the upper right corner of the matrix of areas) toward an outside zone (hereinafter referred to as "out-of-area zone") which is disposed adjacent the above areas and surrounds the matrix of areas on the operation unit 8, the operation unit control program 125 provides a hysteresis B1 similar to the hysteresis A1 shown in FIG. 22. Even if the operation unit 8 detects when the user's finger moves out of the area B toward the out-of-area zone, the operation unit control program 125 regards the user's finger as remaining in touch with the area B unless the user's finger moves beyond the hysteresis B1 of the area B. When the user's finger moves beyond the hysteresis B1 and reaches part of the out-of-area zone which is not in the hysteresis B1, the operation unit control program 125 regards the user's finger as having moved into the out-of-area zone.

Therefore, even if the user's finger is in the vicinity of the border between adjacent areas, the user's finger is not regarded as having moved from one of the areas into the other unless the user's finger moves beyond the hysteresis. The cursor displayed on the display unit 7 is prevented from frequently moving between areas 43, or the cursor is prevented from being frequently repeatedly displayed and undisplayed in the border between the 25 areas 43 and the out-of-area zone, due to fluctuations of the coordinates detected by the operation unit 8 in the borders.

When the user's finger moves from the out-of-area zone toward either one of the areas on the four sides of the matrix of areas, i.e., the areas in the first and fifth columns and the first and fifth rows (hereinafter referred to as "areas on the four sides"), which are disposed adjacent to the out-of-area zone, the operation unit control program 125 provides a hysteresis O1 in the border between the out-of-area zone and the matrix of areas. Even if the operation unit 8 detects when the user's finger moves from the out-of-area zone toward the area B, the operation unit control program 125 regards the user's finger as remaining in touch with the out-of-area zone unless the user's finger moves beyond the hysteresis O1. When the user's finger moves beyond the hysteresis O1 and reaches part of the area B which is not in the hysteresis O1, the operation unit control program 125 regards the user's finger as having moved into the area B.

The hysteresis O1 is applied to all the areas on the four sides. Consequently, when the user's finger is in the vicinity of the border between the areas on the four sides and the out-of-area zone, the cursor is prevented from being displayed on the display unit 7 or from being repeatedly displayed and undisplayed due to detection of the contact of the user's finger with the areas of the operation buttons although the user may be thinking that the user's finger does not touch any operation buttons.

Figure 25A:
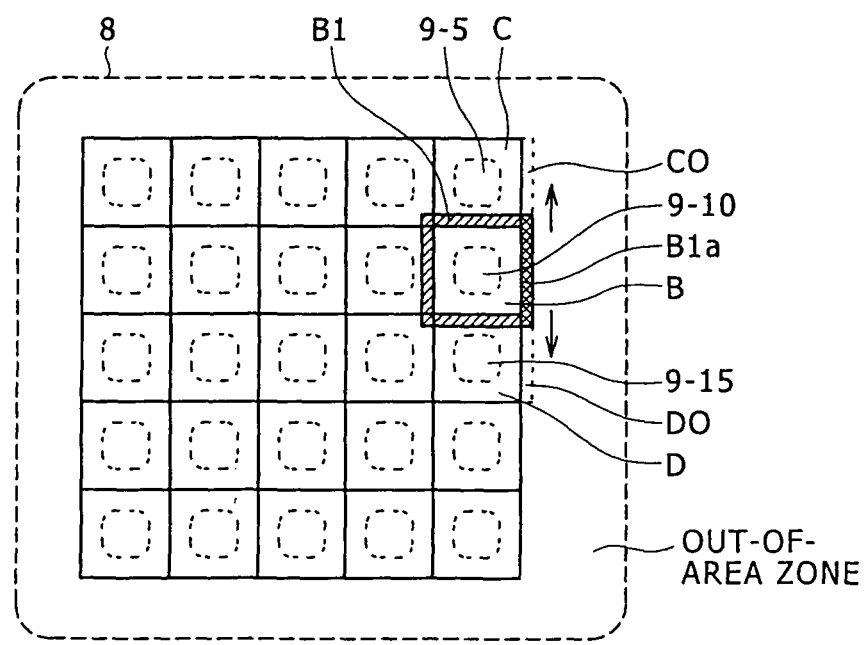
FIGS. 25A and 25B are views showing a process of moving the finger between areas on four sides.

When the user's finger moves between the areas on the four sides like the area B, since the hysteresis B1 is provided, the user's finger is regarded as touching the area surrounded by the hysteresis B1 as long as the user's finger is in the hysteresis B1 even if the operation unit 8 detects the user's finger as actually touching the out-of-area zone. Therefore, as shown in FIG. 25A, when the user's finger touches an area B1a of the hysteresis B1 which overlaps the out-of-area zone on the right-hand side of the hysteresis B1, the user's finger is regarded as touching the area B, and the cursor is displayed in the area 43 corresponding to the area B on the display unit 7.

When the user who is thinking that the user's finger is touching the area B (the operation button 9-10) is to move the finger from the area B toward an area on one (the first column) of the four sides, such as an area C corresponding to the operation button 9-5 or an area D corresponding to the operation button 9-15, the user's finger moves vertically beyond an upper or lower end of the hysteresis B1 into touch with an area CO or an area DO indicated by the dotted line. As the area CO or the area DO does not belong to the area C or the area D, but belongs to the out-of-area zone, the operation unit 8 determines that the user's finger does not touch any areas. Consequently, the cursor that has been displayed in the area 43 corresponding to the area B (the operation button 9-10) on the display unit 7 disappears.

The operation buttons corresponding to the areas in the first column, e.g., the operation buttons 9-5, 9-10, and the operation buttons corresponding to the areas in the fifth column, e.g., the operation buttons 9-1, 9-16, serve to display the navigation buttons 55 on the display unit 7, and are frequently used by the user to change displayed images and while music tunes are being played back. Therefore, the above problems that arise with respect to these operation buttons tend to make the portable electronic device 1 difficult to use by the user.

Figure 25B:
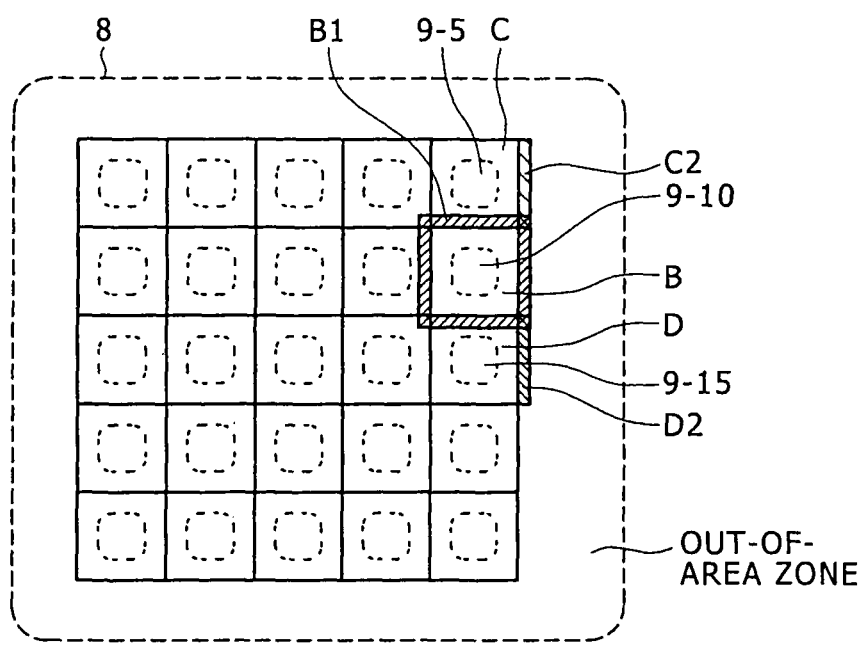

According to the present embodiment, when the user's finger moves from the area B to the area C or the area D, as shown in FIG. 25B, the operation unit control program 125 widens the area C or the area D by the area C2 or the area D2, i.e., by the area B1a of the hysteresis B1 which overlaps the out-of-area zone. Therefore, when the user's finger moves into touch with the area C2 or the area D2, the user's finger is determined as touching the area C or the area D, so that the displayed cursor will not disappear. Accordingly, the portable electronic device 1 provides a comfortable environment for the user to operate the operation unit 8.

Figure 27:
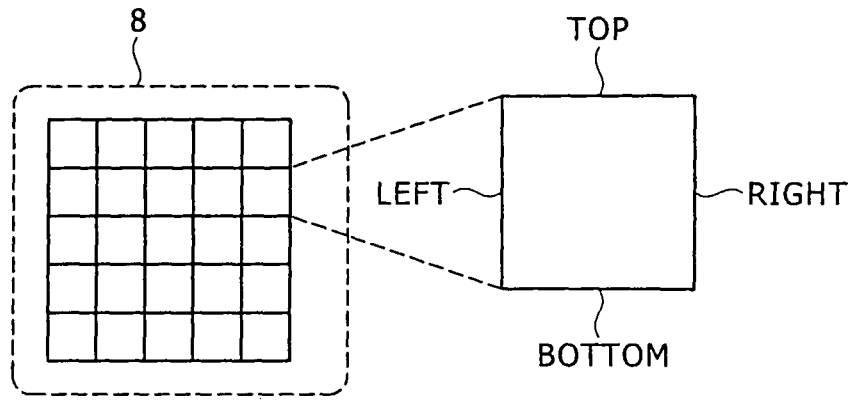
FIG. 27 is a view showing names assigned to the boundaries of each of the areas shown in FIG. 26.

FIG. 26 shows a sequence for determining areas based on hystereses. A process of determining areas touched by the user, mainly when the user's finger moves between areas on the four sides, according to the operation unit control program 125 will be described below. In FIG. 26, the 25 areas on the operation unit 8 are referred to as normal areas, and areas representing the combination of those normal areas and the hystereses are referred to as border areas. As shown in FIG. 27, upper, lower, left, and right ends of each of the normal areas and the border areas are referred to as top, bottom, left, and right borders. X coordinates increase leftwardly from the origin at the upper right corner of the operation unit 8, and Y coordinates increase downwardly from the origin, as shown in FIGS. 19 and 20.

As shown in FIG. 26, if the operation unit 8 detects when the user's finger touches either one of the areas on the operation unit 8, it is determined whether the area is touched for the first time or not in step S1. If the area is touched for the first time (YES in step S1), then no hysteresis is introduced, and it is determined that the user's finger has touched an ordinary area corresponding to the coordinates detected by the operation unit 8 in step S2.

If the area is touched not for the first time (NO in step S1), i.e., if there is a previously touched area, then it is determined whether the presently touched area is the same as the previously touched area in terms of a border area or not in step S3. If the presently touched area is the same as the previously touched area (YES in step S3), then the previously touched area is determined as the presently touched area in step S4.

If the presently touched area is not the same as the previously touched area (NO in step S3), i.e., if the user's finger has moved to an area different from the previously touched area, then it is determined whether the previously touched area is in the first column or not and also whether the X coordinate presently detected by the operation unit 8 is smaller than the left end of a border area in the first column or not in step S5. If the previously touched area is in the first column and also if the X coordinate presently detected by the operation unit 8 is smaller than the left end of the border area in the first column (YES in step S5), i.e., if the user's finger is to move between areas in the first column, then the presently touched area is determined in terms of a border area for the right ends in the first column (all the five areas) and in terms of a normal area for the other top, bottom, and left ends in step S6.

If the previously touched area is not in the first column or if the X coordinate presently detected by the operation unit 8 is larger than the left end of the border area in the first column though the previously touched area is in the first column (NO in step S5), then it is determined whether the previously touched area is in the fifth column or not and also whether the X coordinate presently detected by the operation unit 8 is smaller than the right end of a border area in the fifth column or not in step S7. If the previously touched area is in the fifth column and also if the X coordinate presently detected by the operation unit 8 is smaller than the right end of the border area in the fifth column (YES in step S7), i.e., if the user's finger is to move between areas in the fifth column, then the presently touched area is determined in terms of a border area for the left ends in the fifth column and in terms of a normal area for the other ends in step S8.

If the previously touched area is not in the fifth column or if the X coordinate presently detected by the operation unit 8 is smaller than the right end of the border area in the fifth column though the previously touched area is in the fifth column (NO in step S7), then it is determined whether the previously touched area is in the first row or not and also whether the Y coordinate presently detected by the operation unit 8 is smaller than the bottom end of a border area in the first row or not in step S9. If the previously touched area is in the first row and also if the Y coordinate presently detected by the operation unit 8 is smaller than the bottom end of the border area in the first row (YES in step S9), i.e., if the user's finger is to move between areas in the first row, then the presently touched area is determined in terms of a border area for the top ends in the first row and in terms of a normal area for the other ends in step S10.

If the previously touched area is not in the first row or if the Y coordinate presently detected by the operation unit 8 is larger than the bottom end of the border area in the first row though the previously touched area is in the first row (NO in step S9), then it is determined whether the previously touched area is in the fifth row or not and also whether the Y coordinate presently detected by the operation unit 8 is larger than the top end of a border area in the fifth row or not in step S11. If the previously touched area is in the fifth row and also if the Y coordinate presently detected by the operation unit 8 is larger than the top end of the border area in the fifth row (YES in step S11), i.e., if the user's finger is to move between areas in the fifth row, then the presently touched area is determined in terms of a border area for the top ends in the fifth row and in terms of a normal area for the other ends in step S12.

If the present area is located inwardly of the boarder areas on the four sides of the matrix of areas in the first and fifth columns and the first and fifth rows (NO in step S11), i.e., if the present area is either one of the areas in the second through fourth columns and the second through fourth rows, then control goes to step S2 to determine the present area in terms of ordinary areas. The decision process in step S2 is repeated each time the user's finger moves between areas.

For determining whether the user's finger touches a certain area or not, not only an area to which the user's finger is moved, but also border areas in columns and rows are determined because the processing operation may be too slow if the above decision process is performed each time the user's finger moves to one area in the cases where the user's finger jumps over three or more areas in one column or one row. Of course, it may be possible to determine whether each area that the user's finger moves to is to be determined in terms of border areas or normal areas.

With the hysteresis being thus introduced, it is possible to prevent the cursor displayed on the display unit 7 from frequently moving between areas 43, or to prevent the cursor from being frequently repeatedly displayed and undisplayed due to fluctuations of the coordinates detected by the operation unit 8, which can be caused despite the user does not intend.

Another process of controlling the operation unit 8 according to the operation unit control program 125 will be described below.

The foregoing process serves to deal with deviations and fluctuations of the user's finger touching an operation button in the XY coordinate system. Another factor that is responsible for causing the cursor to be repeatedly be displayed and undisplayed is fluctuations in detected values indicating that the user's finger contacts or does not contact operation buttons.

According to the present embodiment, as described above, the operation unit 8 determines whether the user's finger contacts an operation button or not based on an electrostatic capacitance change. Specifically, the operation unit 8 detects how close the user's finger is to the operation unit 8, i.e., whether the user's finger contacts an operation button or not, based on the magnitude of an electrostatic capacitance (hereinafter referred to as "Z value) included in a digital signal produced by the A/D converter 34*d*. The Z value operation unit 8 determines that the user's finger does not contact an operation button if the Z value is equal to 0 ($Z=0$) and that the user's finger contacts an operation button if the Z value is in the range of $0<Z\le63$. However, when the operation unit 8 is electrically charged in its entirety, the Z value may not be equal to 0 even if the user's finger does not contact an operation button.

According to the present embodiment, the operation unit control program 125 makes the Z value adjustable. Specifically, a threshold value is established for the Z value, and if $Z<15$ through 18, then it is determined that the user's finger does not contact an operation button, and if $Z\ge15$ through 18, then it is determined that the user's finger contacts an operation button. With this arrangement, the operation unit 8 can stably detect whether the user's finger contacts an operation button or not even when the operation unit 8 is electrically charged in its entirety, so that the cursor can stably be displayed on the display unit 7.

Even if the above threshold value is established, however, the operation unit 8 may possibly be affected by surrounding parts or may itself be distorted due to aging, for example, lowering the sensitivity thereof to detect its contact with the user's finger in the vicinity of the four sides of the operation unit 8. As a result, the operation unit 8 may detect the Z value as a lower value. In this case, even though the cursor is displayed on the display unit 7 when the user's finger touches operation buttons near the center of the operation unit 8, for example, the cursor may not be displayed on the display unit 7 when the user's finger moves to operation buttons near the four sides of the operation unit 7, thereby causing the cursor to be repeatedly displayed and undisplayed.

According to the present embodiment, the operation unit control program 125 measures the Z value at certain time intervals, and determines that the user's finger does not touch an operation button if the Z value is equal to or lower than the threshold value successively for a preset number of times. For example, if the operation unit control program 125 measures the Z value at time intervals of 10 ms., then the operation unit control program 125 determines that the user's finger does not touch an operation button if the Z value is equal to or lower than the threshold value successively for six times. The count of six times is employed because deviations in cycles shorter than 60 ms. are not caused by natural fluctuations of the human finger.

The operation unit control program 125 determines whether the user's finger touches an operation button or not in a plurality of cycles each for determining whether the Z value is equal to or lower than the threshold value successively for six times. If the number of times, hereinafter referred to as "Z counter", that it is determined that the user's finger does not touch an operation button is in excess of a preset maximum value, e.g., two, then the operation unit control program 125 determines that the user's finger does not touch an operation button.

Figure 28:
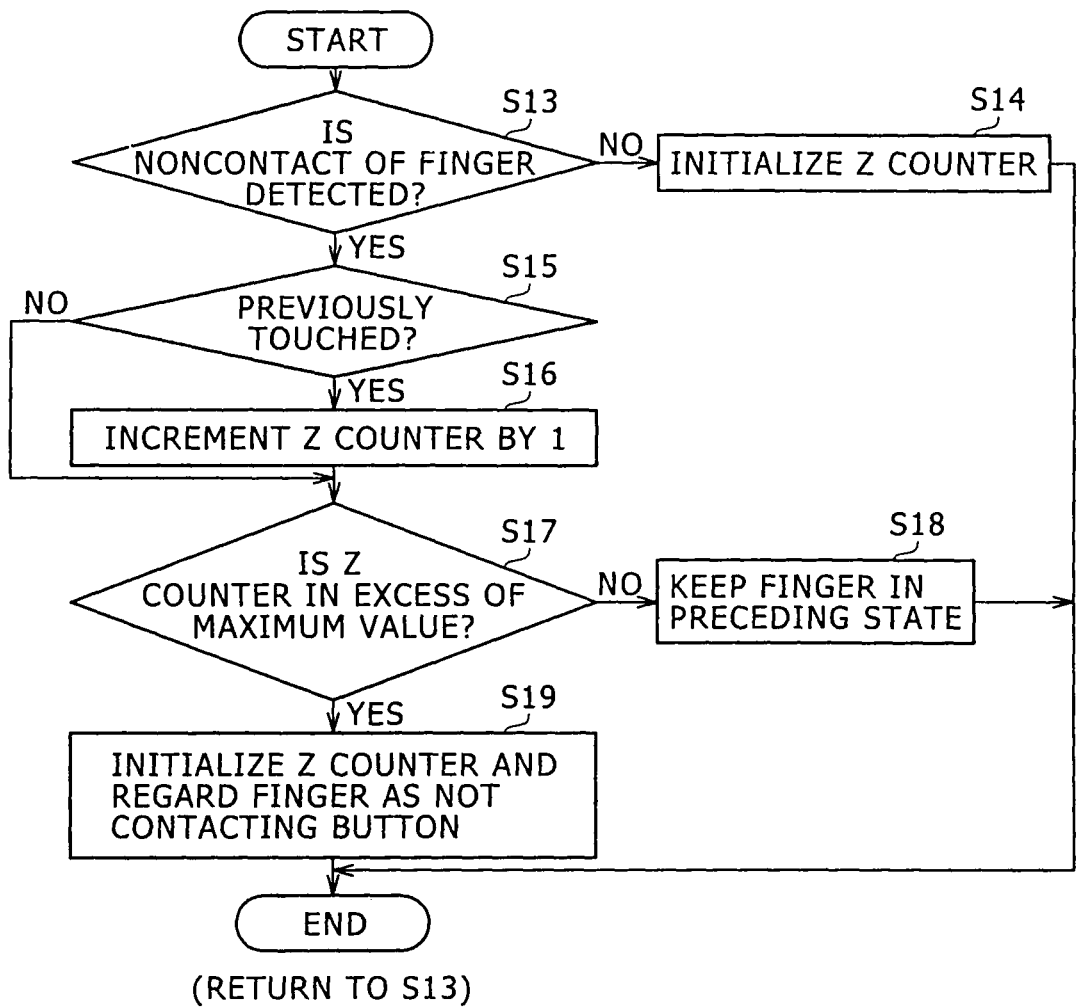
FIG. 28 is a flowchart of a sequence for determining noncontact of the user's finger.

FIG. 28 shows a sequence for determining noncontact of the user's finger according to the above process. The term "previously" or "preceding" in FIG. 28 is used to refer to an occurrence in one cycle for determining whether the Z value is equal to or lower than the threshold value successively for six times.

As shown in FIG. 28, the operation unit control program 125 detects whether the user's finger does not touch an operation button or not by detecting the Z value in one cycle for determining whether the Z value is equal to or lower than the threshold value successively for a certain number of times, e.g., six times, in step S13. If it is detected that the user's finger touches an operation button (NO in step S13), then the operation unit control program 125 initializes the Z counter in step S14.

If it is detected that the user's finger does not touch an operation button (YES in step S13), then the operation unit control program 125 determines whether the user's finger has previously touched an operation button (before it is detected that the user's finger does not touch an operation button) or not in step S15. If the user's finger has previously touched an operation button (YES in step S15), then the operation unit control program 125 increments the Z counter by 1 in step S16. Then, the operation unit control program 125 determines whether the Z counter exceeds a preset maximum value or not in step S17. If the user's finger has not previously touched an operation button (NO in step S15), then control also goes to step S17 to determine whether the Z counter exceeds the preset maximum value or not.

If the Z counter does not exceed the preset maximum value (NO in step S17), then the operation unit control program 125 keeps the user's finger in a preceding state in step S18. Specifically, if the user's finger has previously touched an operation button, then the operation unit control program 125 keeps the user's finger in touch with the operation button, and if the user's finger has not previously touched an operation button, then the operation unit control program 125 keeps the user's finger out of touch with the operation button. If the Z counter exceeds the preset maximum value (YES in step S17), then the operation unit control program 125 initializes the Z counter and regards the user's finger as not contacting an operation button in step S19. Until the user's finger is regarded as not contacting an operation button, control returns from END to step S13, repeating the above process.

According to the above process, the threshold value is established to determine whether the user's finger touches an operation button or not. If it is detected that the user's finger does not touch an operation button for a predetermined number of times, e.g., twice, based on the Z counter, then the user's finger is regarded as not contacting an operation button for the first time. In this manner, the cursor is prevented from being frequently repeatedly displayed and undisplayed on the display unit 7.

According to the present embodiment, deviations of detected values, which tend to be caused depending on the area touched by the user's finger, the time for which the user's finger moves, and noise produced by the operation unit 8 itself, are eliminated by the above process employing the polynomial approximation, the process employing the hysteresis, or the process employing the Z counter, allowing the portable electronic device 1 to accurately reflect user's input operation while keeping the portable electronic device small in size. The above processes may be performed in any desired combination by the portable electronic device 1.

The present invention is not limited to the details in the above embodiments, but various changes and modifications may be made therein.

For example, in the above embodiment, X and Y coordinates are transformed in the polynomial approximation process. However, the polynomial approximation process may be performed such that X and Y coordinates depend upon each other. According to such a modification, specifically, transformed coordinates are expressed using linear polynomials as follows:

$$X=ax+by+c$$

$$Y=dx+ey+f,$$

and expressed using quadratic polynomials as follows:

$$X=ax^2+by^2+cxy+dx+ey+f$$

$$Y=gx^2+hy^2+ixy+jx+ky+l$$

As shown in FIG. 19, since the user's finger touches operation buttons from the lower right corner of the operation unit 8, X coordinates tend to suffer large deviations in upper and lower portions of the operation unit 8, and deviations of Y coordinates tend to become larger as X coordinates are larger in an upper portion of the operation unit 8. Since such coordinate deviations depend upon both X and Y coordinates, the polynomial approximation process can be performed more accurately if such tendencies are taken into account.

The coordinates (X, Y) may be expressed using polar coordinates (R, Θ). Furthermore, the above coordinate system may be transformed into a new coordinate system in advance by inverse functions of the above polynomials, and coordinates detected by the above detecting means may be directly used as transformed coordinates. Since a new coordinate system is produced in advance, the amount of processing operation that is required may be reduced. This advantage manifests itself if polynomials of higher degree are employed.

In the above embodiment, the operation unit 8 includes an electrostatic touch-pad device for detecting whether the user's finger has touched an operation button or not and also for detecting the coordinates of a position contacted by the user's finger, based on an electrostatic capacitance change. However, the operation unit 8 may include a pressure-sensitive touch-pad device for detecting whether the user's finger has touched an operation button or not and also for detecting the coordinates of a position contacted by the user's finger, based on the pressure applied by the user's finger.

The operation unit 8 according to the illustrated embodiment is capable of detecting values ranging from 0 through 1023 in the X-axis direction of the XY coordinate system and detecting values ranging from 0 through 767 in the Y-axis direction of the XY coordinate system. According to some touch-pad device specifications, the above ranges may have maximum and minimum values contiguous to each other. In such a situation, if an X coordinate deviates from the minimum value of 0, then the operation unit 8 may also detect the maximum value of 1023 and hence may detect contact by the user's finger with an area in the first column and an area in the fifth column, with the result that the cursor displayed on the display unit 7 may undesirably jump between those areas.

To solve the above problem, the operation unit 8 is adjusted to invalidate values close to the maximum and minimum values to reduce the possibility that abnormal values will be detected. Specifically, the minimum X coordinate value of 0 is set to a range from +60 to 70, and the maximum X coordinate value of 1023 is set to a range from 953 to 963 (60 to 70 smaller than 1023). With these minimum and maximum value settings, unwanted jumps of the displayed cursor are minimized when detected coordinates deviate from the minimum value or the maximum value.

However, since the ranges of invalidated values cannot be too large, the displayed cursor may still possibly jump regardless of the above preventive process. According to one solution, when it is detected that X and Y coordinates have jumped from the first column to the fifth column or from the first row to the fifth row, the first jump is ignored and the cursor is displayed in its original position, and the second jump is made valid. The solution is based on the premise that the human finger does not jump from the first column to the fifth column in a cycle of 60 ms. or less, for example, as with the above process employing the Z counter. If a unit process for detecting the coordinates of an area touched by the user's finger is 10 ms., then it is determined that the area is touched by the user's finger for the first time when it is detected that the user's finger remains in the same area successively six times, i.e., successively in six unit processes, and after it is detected for certain that the user's finger remains in the same area in two cycles each of 60 ms., i.e., each having six unit processes, indicating that no deviations or no noise has occurred, the detected coordinates are reflected in the displayed cursor.

Figure 29:
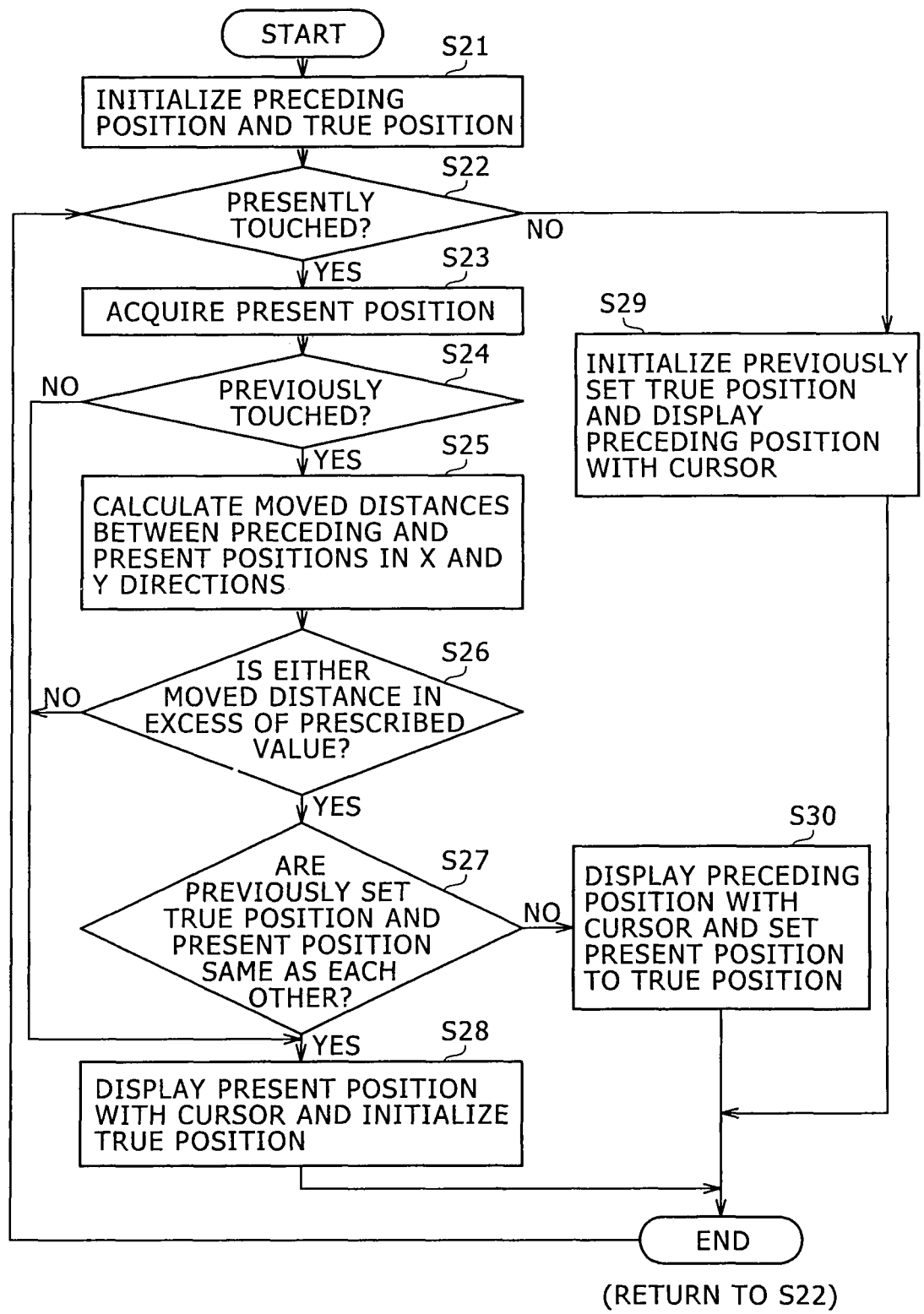
FIG. 29 is a flowchart of a sequence for eliminating a jump between areas.

FIG. 29 shows such a sequence for eliminating a jump between areas. In FIG. 29, the term "position" refers to an area touched by the user's finger among the areas arranged in the five rows and five columns. The term "preceding position" refers to a position that is detected for the first time in a cycle of 60 ms, and the term "present position" to a position that is detected in a cycle next to the above cycle of 60 ms. The term "true position" refers to a position which is not displayed as an actual cursor on the display unit 7, but temporarily stored in the portable electronic device 1, e.g., in the RAM 109.

The operation unit control program 125 initializes a preceding position and a true position among the areas arranged in the five rows and five columns in step S21. Then, the operation unit control program 125 confirms the Z counter to determine whether the user's finger is currently touching the operation unit 8 or not in step S22. If the user's finger is currently touching the operation unit 8 (YES in step S22), then the operation unit control program 125 acquires a present position in step S23.

Then, the operation unit control program 125 determines whether the user's finger previously touched the operation unit 8 or not in step S24. If the user's finger previously touched the operation unit 8 (YES in step S24), then the operation unit control program 125 calculates moved distances between the preceding and present positions in the X and Y directions in step S25. The operation unit control program 125 determines whether either one of the calculated moved distances in the X and Y directions exceeds a predetermined value, which may be the distance between the first and fifth columns in the X direction or the distance between the first and fifth rows in the Y direction, or not in step S26.

If the user's finger did not previously touch the operation unit 8 (NO in step S24) or if the moved distance does not exceed the predetermined value (NO in step S26), then the operation unit control program 125 displays the cursor in the area 43 on the display unit 7 which corresponds to the present position, and initializes the true position in step S28.

If the moved distance exceeds the predetermined value (YES in step S26), then the operation unit control program 125 determines whether the previously set true position and the present position are the same as each other or not, i.e., whether the previously set true position is detected again at present or not in step S27. If the previously set true position and the present position are the same as each other (YES in step S27), then the operation unit control program 125 determines that the coordinates are detected corrected free of noise or deviations. The operation unit control program 125 then goes to step S28 to display the cursor in the area 43 on the display unit 7 which corresponds to the present position, and initializes the true position.

If the user's finger is not currently touching any position on the operation unit 8 (NO in step S22) or if the user's finger has not touched any position on the operation unit 8 (from step S21), the operation unit control program 125 does not display any cursor on the display unit 7. If it is detected that the user's finger is not currently touching any position though the user's finger has touched a position on the operation unit 8, then the operation unit control program 125 determines that the previously detected value is caused by noise or a coordinate deviation, and initializes the previously set true position and displays the preceding position as the cursor indicating the present position on the display unit 7 in step S29.

According to the above process, if a detected position exceeds the predetermined value, then it is held internally as a true position, and if a value is detected as a present position in the next cycle, then the present position is determined as being correctly detected when the true position and the present position agree with each other. If the moved distance does not exceed the predetermined value, then the present position is also determined as being correctly detected.

As described above, if an abnormal moved distance is detected in a first cycle, then it is ignored, and determined as noise or a deviation unless a moved distance that is identical to the abnormal moved distance is detected in a second cycle. In this manner, the cursor is prevented from being displayed in a manner not intended by the user.

In the above process, the predetermined value may be set to a desired value. Therefore, the process is applicable to not only the prevention of a jump from the first column (first row) to the fifth column (fifth row), but also to the prevention of a jump over a smaller distance, e.g., from the first column to the third column. Specifically, a maximum distance that the human finger can move is established, and if the operation unit 8 detects a moved distance in excess of the maximum distance, then the moved distance is invalidated or made valid only when the moved distance is detected a plurality of times. The process is also generally applicable to a general touch-pad device for invalidating a moved distance thereon and preventing the moved distance from being displayed thereon if the moved distance is in excess of a maximum distance, or making the moved distance valid if it is detected a plurality of times.

It should be understood by those skilled in the art that various modifications, combinations, sub-combinations and alterations may occur depending on design requirements and other factors insofar as they are within the scope of the appended claims or the equivalents thereof.

What is claimed is:
1. A portable electronic device, comprising:
a display device configured to display a cursor;
an operation surface divided into at least a first area and a second area, wherein
   said operation surface is configured to receive an input corresponding to a touch operation of a user finger on each of said first area and said second area, and
   said first area is associated with a first operation button of a plurality of operation buttons and said second area is associated with a second operation button of said plurality of operation buttons;
a peripheral area that surrounds both said first area and said second area,
   wherein said peripheral area is at periphery of said operation surface; and circuitry configured to:
      measure, repeatedly at a time interval, a magnitude of electrostatic capacitance corresponding to said first operation button;
      detect whether each of said repeatedly measured magnitude exceeds a specific threshold value;
      determine a number of times said repeatedly measured magnitude exceeds said specific threshold value;
      detect a first touch operation of said user finger on said first area based on said determined number of times is greater than a specific number;

set a first hypothetical area frame outside said first area based on said first touch operation, wherein a first portion of said first hypothetical area frame overlaps a second portion of said peripheral area;

detect a first movement of said user finger from said first portion of said first hypothetical area frame to a third portion of said peripheral area, wherein said third portion of said peripheral area is adjacent to said second area;

determine, based on said first movement, that said user finger is not in contact with each of said first area, said second area, and said first hypothetical area frame;

expand said second area by a fourth portion based on said determination, wherein
an area of said fourth portion is equal to an area of said first portion, and
said fourth portion overlaps said third portion of said peripheral area;

detect a second movement of said user finger in said fourth portion of said expanded second area;

determine a second touch operation of said user finger in said fourth portion, based on said detection of said second movement; and control said display device to display said cursor in said second area based on said determination of said second touch operation.

2. The portable electronic device according to claim 1, wherein said circuitry is further configured to:
detect a third touch operation of said user finger on said first area;
set a second hypothetical area frame outside said first area touched by said user finger, wherein said second hypothetical area frame surrounds said first area; and
detect a fourth touch operation of said user finger on said first area, based on a third movement of said user finger from said first area to said peripheral area and a determination that said user finger is in contact with both said peripheral area and said second hypothetical area frame.

3. The portable electronic device according to claim 1, wherein said circuitry is further configured to:
set a third hypothetical area frame along a border of said operation surface with respect to said peripheral area; and
identify no touch of said user finger on said operation surface, based on a third movement of said user finger from said peripheral area to said operation surface and a determination that said user finger is in contact with both said operation surface and said third hypothetical area frame.

4. The portable electronic device according to claim 1, wherein said circuitry is further configured to:
measure a time required for said user finger to move from said first area to said second area; and
regard said user finger as unmoved from said first area to said second area based on said measured time that is equal to or larger than a threshold time.

5. A method, comprising:
in a portable electronic device comprising an operation surface:
measuring, repeatedly at a time interval, a magnitude of electrostatic capacitance corresponding to a first operation button of said operation surface;
detecting whether each of said repeatedly measured magnitude exceeds a specific threshold value;

determining a number of times said repeatedly measured magnitude exceeds said specific threshold value;

detecting a first touch operation of a user finger on a first area of said operation surface of said portable electronic device, based on said determined number of times is greater than a specific number, wherein
said first area is associated with said first operation button of a plurality of operation buttons and a second area of said operation surface is associated with a second operation button of said plurality of operation buttons;

setting a first hypothetical area frame outside said first area based on said first touch operation, wherein
a first portion of said first hypothetical area frame overlaps a second portion of a peripheral area that surrounds both said first area and said second area, and
said peripheral area is at periphery of said operation surface;

detecting a first movement of said user finger from said first portion of said first hypothetical area frame to a third portion of said peripheral area, wherein said third portion of said peripheral area is adjacent to said second area;

determining, based on said first movement, that said user finger is not in contact with each of said first area, said second area, and said first hypothetical area frame;

expanding said second area by a fourth portion based on said determination, wherein
an area of said fourth portion is equal to an area of said first portion, and
said fourth portion overlaps said third portion of said peripheral area;

detecting a second movement of said user finger in said fourth portion of said expanded second area;

determining a second touch operation of said user finger in said fourth portion, based on said detection of said second movement; and controlling a display device to display a cursor in said second area based on said determination of said second touch operation.

6. A non-transitory computer-readable medium stored thereon, computer-executable instructions, which when executed by a processor, cause said processor to execute operations, said operations comprising:
measuring, repeatedly at a time interval, a magnitude of electrostatic capacitance corresponding to a first operation button of an operation surface of a portable electronic device;

detecting whether each of said repeatedly measured magnitude exceeds a specific threshold value;

determining a number of times said repeatedly measured magnitude exceeds said specific threshold value;

detecting a first touch operation of a user finger on a first area of said operation surface of said portable electronic device, based on said determined number of times is greater than a specific number, wherein
said first area is associated with said first operation button of a plurality of operation buttons and a second area of said operation surface is associated with a second operation button of said plurality of operation buttons;

setting a first hypothetical area frame outside said first area based on said first touch operation, wherein a first portion of said first hypothetical area frame overlaps a second portion of a peripheral area that surrounds both said first area and said second area, and said peripheral area is at periphery of said operation surface;

detecting a first movement of said user finger from said first portion of said first hypothetical area frame to a third portion of said peripheral area, wherein said third portion of said peripheral area is adjacent to said second area;

determining, based on said first movement, that said user finger is not in contact with each of said first area, said second area, and said first hypothetical area frame;

expanding said second area by a fourth portion based on said determination, wherein an area of said fourth portion is equal to an area of said first portion, and said fourth portion overlaps said third portion of said peripheral area;

detecting a second movement of said user finger in said fourth portion of said expanded second area;

determining a second touch operation of said user finger in said fourth portion, based on said detection of said second movement; and controlling a display device to display a cursor in said second area based on said determination of said second touch operation.

7. The portable electronic device according to claim 1, wherein said circuitry is further configured to:

filter sampled coordinate data corresponding to said first touch operation on said operation surface; and determine coordinates of a desired touch area based on said filtered sampled coordinate data.

8. The portable electronic device according to claim 7, wherein said circuitry is further configured to filter said sampled coordinate data based on polynomial approximation.

* * * * *